US008690305B2

(12) United States Patent
Breton et al.

(10) Patent No.: US 8,690,305 B2
(45) Date of Patent: Apr. 8, 2014

(54) HIGH REACTIVITY CURABLE PASTE INK COMPOSITIONS

(75) Inventors: Marcel P. Breton, Mississauga (CA); Michelle N. Chrétien, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 381 days.

(21) Appl. No.: 13/105,090

(22) Filed: May 11, 2011

(65) Prior Publication Data

US 2012/0287199 A1 Nov. 15, 2012

(51) Int. Cl.
*B41J 2/01* (2006.01)
(52) U.S. Cl.
USPC .............................. 347/100; 347/95; 347/103
(58) Field of Classification Search
USPC ............... 347/100, 88, 99, 103, 102, 95, 96; 106/31.6, 31.27, 31.13; 523/160, 161; 522/33, 50, 64, 78, 79
See application file for complete search history.

(56) References Cited

U.S. PATENT DOCUMENTS

| | | | |
|---|---|---|---|
| 6,896,937 B2 | 5/2005 | Woudenberg | |
| 7,276,614 B2 | 10/2007 | Toma et al. | |
| 7,279,587 B2 | 10/2007 | Odell et al. | |
| 7,322,688 B2 | 1/2008 | Woudenberg | |
| 7,559,639 B2 | 7/2009 | Belelie et al. | |
| 8,084,637 B2 | 12/2011 | Chopra et al. | |
| 2007/0120910 A1 | 5/2007 | Odell et al. | |
| 2007/0142492 A1* | 6/2007 | Odell et al. | 522/74 |
| 2008/0000384 A1* | 1/2008 | Belelie et al. | 106/31.13 |
| 2008/0122914 A1 | 5/2008 | Toma et al. | |
| 2010/0055484 A1* | 3/2010 | Chretien et al. | 428/484.1 |
| 2010/0242790 A1 | 9/2010 | Belelie et al. | |
| 2010/0304040 A1 | 12/2010 | Chrétien et al. | |
| 2011/0152396 A1* | 6/2011 | Chretien et al. | 522/26 |
| 2011/0152397 A1* | 6/2011 | Breton et al. | 522/42 |
| 2011/0196057 A1* | 8/2011 | Breton et al. | 522/33 |
| 2011/0196058 A1 | 8/2011 | Breton et al. | |
| 2011/0262643 A1* | 10/2011 | Chopra et al. | 427/256 |
| 2012/0013690 A1* | 1/2012 | Breton et al. | 347/100 |
| 2012/0224011 A1* | 9/2012 | Chretien et al. | 347/102 |

OTHER PUBLICATIONS

Commonly Assigned, co-pending U.S. Patent Application filed May 11, 2011, of Michelle N. Chretien et al., entitled "Robust Curable Solid Inks and Methods for Using Same," 57 pages, U.S. Appl. No. 13/105,825, not yet published.
Commonly Assigned, co-pending U.S. Patent Application filed Dec. 17, 2010, of Marcel P. Breton et al., entitled "Curable Solid Inks for Raised Print Applications and Methods for Using Same," 39 pages, U.S. Appl. No. 12/972,138, not yet published.
"Dimer Acids," Kirk-Othmer Encyclopedia of Chemical Technology, vol. 8, 4th Ed. (1992), pp. 223 to 237.

* cited by examiner

*Primary Examiner* — Manish S Shah
(74) *Attorney, Agent, or Firm* — Marylou J. Lavoie

(57) ABSTRACT

A radiation curable paste ink composition including at least one curable wax that is curable by free radical polymerization; at least one curable liquid component that is a liquid at a temperature of from about 20 to about 25° C., present in an amount of less than about 20 percent by weight based upon the total weight of the curable paste ink composition; optionally, at least one non-curable wax; at least one free-radical photoinitiator or photoinitiating moiety; at least one curable gellant; and optionally, a colorant; wherein the components form a curable ink composition that is a paste at a first temperature, wherein the first temperature is from about 20 to about 25° C.; and wherein the components form a liquid composition at a second temperature, wherein the second temperature is greater than about 40° C.

19 Claims, 1 Drawing Sheet

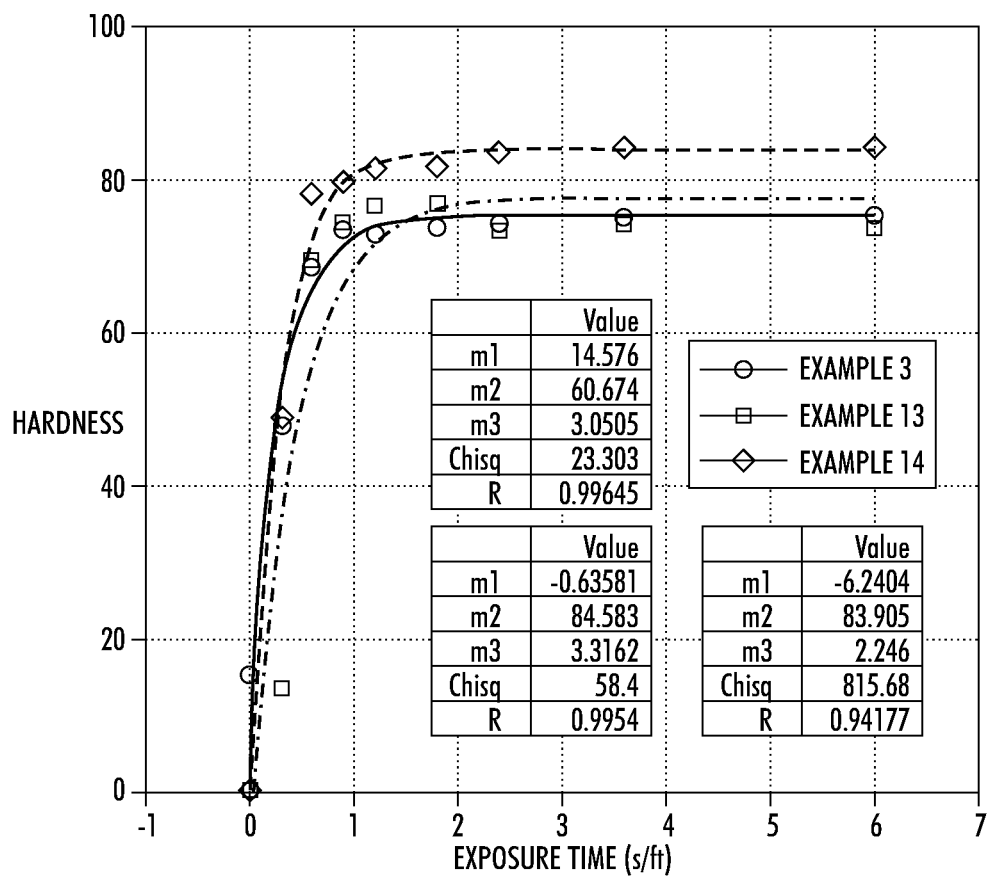

HIGH REACTIVITY CURABLE PASTE INK COMPOSITIONS

RELATED APPLICATIONS

Commonly assigned U.S. patent application Ser. No. 13/105,825, entitled "Robust Curable Solid Inks And Methods For Using Same"), to Michelle N. Chrétien, et al., filed concurrently herewith, is hereby incorporated by reference herein in its entirety.

BACKGROUND

In general, solid inks (also referred to as phase change inks or hot melt inks) are in the solid phase at ambient temperature, but exist in the liquid phase at the elevated operating temperature of an ink jet printing device. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops. Phase change inks have also been used in other printing technologies, such as gravure printing.

Phase change inks for color printing typically comprise a phase change ink carrier composition which is combined with a phase change ink compatible colorant. A series of colored phase change inks can be formed by combining ink carrier compositions with compatible subtractive primary colorants. The subtractive primary colored phase change inks can comprise four component dyes, namely, cyan, magenta, yellow and black, although the inks are not limited to these four colors. These subtractive primary colored inks can be formed by using a single dye, a single pigment, a mixture of dyes, a mixture of pigments, or a combination thereof.

U.S. patent application Ser. No. 12/704,194, of Marcel P. Breton et al., entitled "Curable Solid Ink Compositions," which is hereby incorporated by reference herein in its entirety, describes a curable solid ink composition including a curable component, a non-curable component including an ethoxylated octylphenol derivative, a photoinitiator, and a colorant. The curable solid ink composition has a viscosity in the range of less than 10 cPs at 90° C., a shrinkage value of less than 3%, and a superior curing rate compared to existing curable solid ink compositions. The ethoxylated octylphenol derivatives may be prepared by reacting an ethoxylated octylphenol, a linear alcohol, and diisocyanates, or polyisocyanates.

U.S. patent application Ser. No. 12/642,538, of Marcel P. Breton et al., entitled "Curable Solid Ink Compositions," which is hereby incorporated by reference herein in its entirety, describes a radiation curable solid ink composition comprising at least one curable wax that is curable by free radical polymerization; at least one monomer, oligomer, or prepolymer; at least one non-curable wax; at least one free-radical photoinitiator or photoinitiating moiety; and a colorant; wherein the components form a curable ink composition that is a solid at a first temperature of from about 20 to about 25° C.; and wherein the components form a liquid composition at a second temperature of greater than about 40° C.

U.S. patent application Ser. No. 12/835,198, of Marcel P. Breton et al., entitled "Radiation Curable Solid Ink Compositions Suitable For Transfuse Printing Applications," which is hereby incorporated by reference herein in its entirety, describes curable solid inks, such as radiation-curable solid inks, and their use in forming images, such as through transfuse printing, including radiation-curable solid inks, such as ultraviolet light curable phase change inks, that comprise curable and non-curable waxes.

While currently available ink compositions are suitable for their intended purposes, a need remains for curable solid and paste inks that have lower jetting temperatures, faster phase change characteristics, low energy requirements for spreading and printing, excellent curing performance, increased hardness after curing, and low shrinkage characteristics. There further remains a need for low energy, low total cost of ownership solid and paste inks and processes that further provide high quality imaging characteristics.

SUMMARY

Described is a radiation curable paste ink composition comprising at least one curable wax that is curable by free radical polymerization; at least one curable liquid component that is a liquid at a temperature of from about 20 to about 25° C., present in an amount of less than about 20 percent by weight based upon the total weight of the curable paste ink composition; optionally, a non-curable wax; at least one free-radical photoinitiator or photoinitiating moiety; at least one curable gellant; and optionally, a colorant; wherein the components form a curable ink composition that is a paste at a first temperature, wherein the first temperature is from about 20 to about 25° C.; and wherein the components form a liquid composition at a second temperature, wherein the second temperature is greater than about 40° C.

Further described is a process which comprises (1) incorporating into an ink jet printing apparatus a curable paste ink composition comprising at least one curable wax that is curable by free radical polymerization; at least one curable liquid component that is a liquid at a temperature of from about 20 to about 25° C., present in an amount of less than about 20 percent by weight based upon the total weight of the curable paste ink composition; optionally, at least one non-curable wax; at least one free-radical photoinitiator or photoinitiating moiety; at least one curable gellant; and optionally, a colorant; wherein the components form a curable ink composition that is a paste at a first temperature, wherein the first temperature is from about 20 to about 25° C.; and wherein the components form a liquid composition at a second temperature, wherein the second temperature is greater than about 40° C.; (2) melting the ink; (3) causing droplets of the melted ink to be ejected in an imagewise pattern onto an image receiving substrate, wherein the image receiving substrate is an intermediate transfer member or a final image receiving substrate; (4) optionally transferring the ink image from the intermediate transfer member to the final image receiving substrate; and (5) exposing the imagewise pattern on the final recording substrate to ultraviolet radiation.

BRIEF DESCRIPTION OF THE DRAWINGS

FIG. 1 is a graph showing hardness (y-axis) versus exposure time (x-axis, seconds per foot) for three exemplary curable paste inks in accordance with the present disclosure.

DETAILED DESCRIPTION

A radiation curable paste ink composition is described which can meet the challenges of printing direct to substrate while also enhancing smear resistance. As used herein, the term "paste" means that the ink mixture is of a soft and malleable consistency. In embodiments, the present curable paste inks retain the advantages of handling, safety, and print quality usually associated with solid phase change inks while providing additional breakthrough performance enabling characteristics such as: jettability at temperatures of less than about 100° C., little shrinkage with temperature change, flexibility in design allowing for quick adaptability to application requirements and market needs, for example, ability to achieve gloss variation, hardness tuning, adhesion tuning, no post fusing/glossing step required for many applications, superior hardness compared to previously available wax based inks, no smear, and recyclability of prints.

In some embodiments, a high reactivity radiation curable paste ink composition is provided comprising at least one curable wax that is curable by free radical polymerization; at least one curable liquid component that is a liquid at a temperature of from about 20 to about 25° C., present in an amount of less than about 20 percent by weight based upon the total weight of the curable paste ink composition; optionally, a non-curable wax; at least one free-radical photoinitiator or photoinitiating moiety; at least one curable gellant; and optionally, a colorant; wherein the components form a curable ink composition that is a paste at a first temperature, wherein the first temperature is from about 20 to about 25° C.; and wherein the components form a liquid composition at a second temperature, wherein the second temperature is greater than about 40° C.; wherein the components form a curable paste composition that is a paste at a first temperature of from about 20 to about 25° C.; and wherein the components form a liquid composition at a second temperature of greater than about 40° C., in embodiments from greater than about 40 to about 95° C., or from about 45 to about 80° C., or from about 50 to about 60° C.

In embodiments, the curable paste compositions herein are blends of curable waxes, solid and liquid monomers, curable gellants, colorants, and free-radical photoinitiators, wherein the compositions are paste-like materials below about 40° C. having little or no smell and optionally comprising up to about 40% by weight of non-curable resins, often used as viscosity modifiers and/or compatibilizers. The selected components enable jetting at temperatures in the range of about 70 to about 100° C. (having a viscosity of about 10 to about 15 centipoise in the jetting range of about 70 to about 100° C.). The curable paste ink compositions are a soft paste at room temperature which prevents excessive migration of the printed droplet on porous substrate and enables low energy spreading prior to final cure. After printing, the compositions are cured to provide robust images.

In embodiments, the components enable jetting at temperatures in the range of about 70 to about 100° C. It was found, unexpectedly, that while the present inks can be formulated with a pre-cure hardness in the range of about 0.1 to about 25 at room temperature (about 25° C.) (solid ink hardness is typically about 67), the present curable paste compositions can be photochemically cured with high efficiency even at room temperature to form images with excellent smear resistance and with a hardness after cure that is greater than currently available solid inks. In embodiments, the curable paste ink compositions herein have a hardness after curing of about 50 to about 95, or from about 65 to about 95. In a specific embodiment, the curable paste ink compositions herein have a hardness after curing of from about 70 to about 95. In another specific embodiment, the curable paste ink compositions herein have a hardness after curing of from about 78.4 to about 84.5. The combination of properties enables the present curable paste compositions to play an enabling role in existing and/or new applications and printing systems.

The curable wax herein can be any suitable curable wax that is curable by free radical polymerization. Examples of suitable curable waxes include those that are functionalized with curable groups. The curable groups may include, but are not limited to, acrylate, methacrylate, alkene, vinyl, and allylic ether. In embodiments, the radiation curable paste ink composition contains at least one curable wax and the at least one curable wax contains an acrylate, methacrylate, alkene, vinyl, or allylic ether functional group. These waxes can be synthesized by the reaction of a wax equipped with a transformable functional group, such as carboxylic acid or hydroxyl.

Suitable examples of hydroxyl-terminated polyethylene waxes that may be functionalized with a curable group include, but are not limited to, mixtures of carbon chains with the structure $CH_3-(CH_2)_n-CH_2OH$, where there is a mixture of chain lengths, n, where the average chain length is in selected embodiments in the range of about 16 to about 50, and linear low molecular weight polyethylene, of similar average chain length. Suitable examples of such waxes include, but are not limited to, UNILIN® 350, UNILIN® 425, UNILIN® 550 and UNILIN® 700 with Mn approximately equal to 375, 460, 550 and 700 g/mol, respectively. All of these waxes are commercially available from Baker-Petrolite. Guerbet alcohols, characterized as 2,2-dialkyl-1-ethanols, are also suitable compounds. Specific embodiments of Guerbet alcohols include those containing 16 to 36 carbons, many of which are commercially available from Jarchem Industries Inc., Newark, N.J. In embodiments, PRIPOL® 2033 is selected, PRIPOL® 2033 being a C-36 dimer diol mixture including isomers of the formula

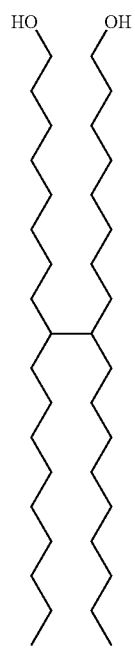 [SMILES: CCCCCCCCCC(CCCCCCCCO)C(CCCCCCCCC)CCCCCCCCO]

as well as other branched isomers which may include unsaturations and cyclic groups, available from Uniqema, New Castle, Del. Further information on C36 dimer diols is disclosed in, for example, "Dimer Acids," Kirk-Othmer Encyclopedia of Chemical Technology, Vol. 8, 4th Ed. (1992), pp. 223 to 237, the disclosure of which is totally incorporated herein by reference. These alcohols can be reacted with carboxylic acids equipped with UV curable moieties to form reactive esters. Examples of these acids include, but are not limited to, acrylic and methacrylic acids, available from Sigma-Aldrich Co. Specific curable monomers include acrylates of UNILIN® 350, UNILIN® 425, UNILIN® 550 and UNILIN® 700.

Suitable examples of carboxylic acid-terminated polyethylene waxes that may be functionalized with a curable group include, but are not limited to, mixtures of carbon chains with the structure $CH_3$—$(CH_2)_n$—COOH, where there is a mixture of chain lengths, n, where the average chain length is in selected embodiments in the range of about 16 to about 50, and linear low molecular weight polyethylene, of similar average chain length. Suitable examples of such waxes include, but are not limited to, UNICID® 350, UNICID® 425, UNICID® 550 and UNICID® 700 with Mn equal to approximately 390, 475, 565 and 720 g/mol, respectively. Other suitable waxes have a structure $CH_3$—$(CH_2)_n$—COOH, such as hexadecanoic or palmitic acid with n=14, heptadecanoic or margaric or daturic acid with n=15, octadecanoic or stearic acid with n=16, eicosanoic or arachidic acid with n=18, docosanoic or behenic acid with n=20, tetracosanoic or lignoceric acid with n=22, hexacosanoic or cerotic acid with n=24, heptacosanoic or carboceric acid with n=25, octacosanoic or montanic acid with n=26, triacontanoic or melissic acid with n=28, dotriacontanoic or lacceroic acid with n=30, tritriacontanoic or ceromelissic or psyllic acid, with n=31, tetratriacontanoic or geddic acid with n=32, pentatriacontanoic or ceroplastic acid with n=33. Guerbet acids, characterized as 2,2-dialkyl ethanoic acids, are also suitable compounds. Selected Guerbet acids include those containing 16 to 36 carbons, many of which are commercially available from Jarchem Industries Inc., Newark, N.J. PRIPOL® 1009 (C-36 dimer acid mixture including isomers of the formula

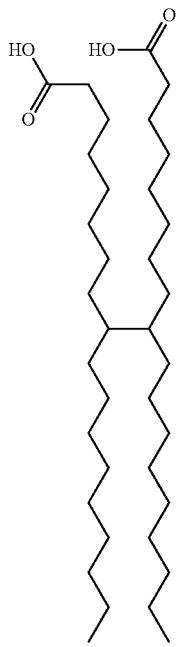 [SMILES: CCCCCCCCCC(CCCCCCCC(=O)O)C(CCCCCCCCC)CCCCCCCC(=O)O]

as well as other branched isomers which may include unsaturations and cyclic groups, available from Uniqema, New Castle, Del., can also be used. These carboxylic acids can be reacted with alcohols equipped with UV curable moieties to form reactive esters. Examples of these alcohols include, but are not limited to, 2-allyloxyethanol from Sigma-Aldrich Co.;

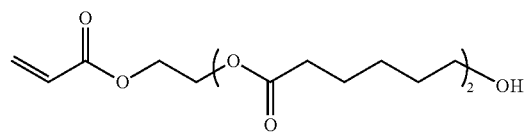

SR495B® caprolactone acrylate from Sartomer Company, Inc.;

TONE® M-101 (R=H, $n_{avg}$=1), TONE® M-100 (R=H, $n_{avg}$=2) and TONE® M-201 (R=Me, $n_{avg}$=1) from The Dow Chemical Company; and

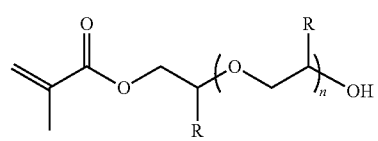

CD572® (R=H, n=10) and SR604® (R=Me, n=4) from Sartomer Company, Inc.

In embodiments, the curable wax is a curable acrylate wax having a melting point of from about 50 to about 60° C.

In specific embodiments, the curable wax is Unilin® 350 acrylate a curable acrylate wax (C22, C23, C24 mixture, melting point about 50 to about 60° C.) available from Baker Hughes, Incorporated, PP-U350a-1®, a curable polypropylene wax available from Clariant, or a combination thereof. Synthesis of Unilin® 350 curable acrylate wax is described in U.S. Pat. No. 7,559,639, which is hereby incorporated by reference herein in its entirety.

The curable wax can be present in any suitable amount. In embodiments, the curable wax can be present in an amount of from about 1 to about 25%, or from about 2 to about 20%, or from about 2.5 to about 15%, by weight based upon the total weight of the curable solid ink composition, although the amounts can be outside of these ranges.

The radiation curable paste ink compositions disclosed herein can comprise any suitable curable liquid component that is a liquid at room temperature, in embodiments at about 20 to about 25° C. Examples of suitable materials for the liquid curable component herein include liquid curable monomer compounds selected from the group consisting of monofunctional monomers, difunctional monomers, trifunctional monomers, pentafunctional monomers, and combinations thereof. In embodiments, the liquid curable component comprises a multifunctional monomer. In other embodiments, the liquid curable component comprises a liquid curable monomer having at least three functional groups, that is, a trifunctional monomer.

The at least one curable liquid component can comprise nonpolar liquid acrylate and methacrylate monomers including (but are not limited to) isobornyl acrylate, isobornyl methacrylate, caprolactone acrylate, 2-phenoxyethyl acrylate, isooctylacrylate, isooctylmethacrylate, butyl acrylate, and the like, as well as mixtures and combinations thereof. In embodiments, the radiation curable paste ink composition herein comprises at least one monomer, oligomer, or prepolymer that is a nonpolar liquid acrylate or methacrylate monomer selected from the group consisting of isobornyl acrylate, isobornyl methacrylate, caprolactone acrylate, 2-phenoxyethyl acrylate, isooctylacrylate, isooctylmethacrylate, butyl acrylate, or a mixture or combination thereof.

In addition, multifunctional acrylate and methacrylate monomers and oligomers can be selected as the at least one curable liquid component. Examples of suitable multifunctional acrylate and methacrylate monomers and oligomers include (but are not limited to) pentaerythritol tetraacrylate, pentaerythritol tetramethacrylate, 1,2-ethylene glycol diacrylate, 1,2-ethylene glycol dimethacrylate, 1,6-hexanediol diacrylate, 1,6-hexanediol dimethacrylate, 1,12-dodecanol diacrylate, 1,12-dodecanol dimethacrylate, tris(2-hydroxy ethyl) isocyanurate triacrylate, propoxylated neopentyl glycol diacrylate (available from Sartomer Co. Inc. as SR 9003®), hexanediol diacrylate, tripropylene glycol diacrylate, dipropylene glycol diacrylate, amine modified polyether acrylates (available as PO 83 F®, LR 8869®, and/or LR 8889® (all available from BASF Corporation), trimethylolpropane triacrylate, glycerol propoxylate triacrylate, dipentaerythritol pentaacrylate, dipentaerythritol hexaacrylate, ethoxylated pentaerythritol tetraacrylate (available from Sartomer Co. Inc. as SR 494®), and the like, as well as mixtures and combinations thereof.

In specific embodiments, the liquid curable component is selected from a ditrimethylol propane tetraacrylate compound of the formula

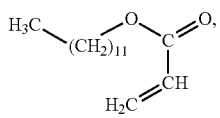

available from Sartomer Co. Inc. as SR 335®), a propoxylated (2) neopentyl glycol diacrylate compound of the formula

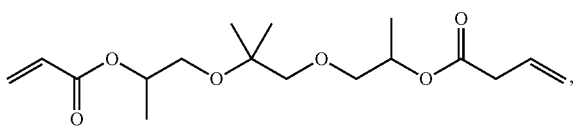 [SMILES: C=CCC(=O)OC(C)COCC(C)(C)OCC(C)OC(=O)C=C]

available from Sartomer Co. Inc. as SR 9003®), an ethoxylated (3) trimethylol propane triacrylate compound of the formula

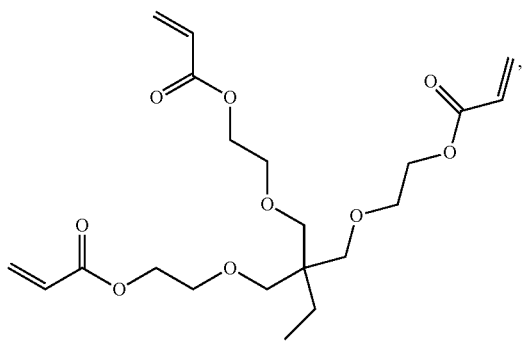 [SMILES: C=CC(=O)OCCOCC(CC)(COCCOC(=O)C=C)COCCOC(=O)C=C]

available from Sartomer Co. Inc. as SR 454®), a dipentaerythritol pentacrylate compound of the formula

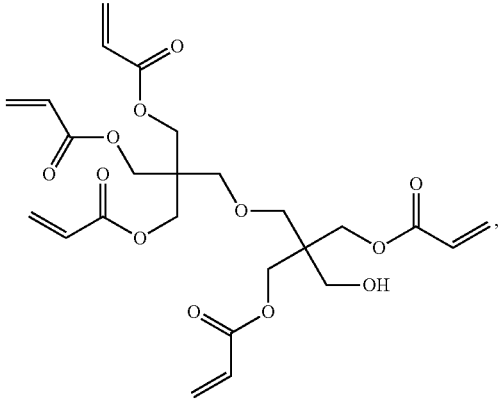 [SMILES: C=CC(=O)OCC(CO)(COCC(COC(=O)C=C)(COC(=O)C=C)COC(=O)C=C)COC(=O)C=C]

available from Sartomer Co. Inc. as SR 399®), and mixtures and combinations thereof.

The at least one curable liquid component can be present in any suitable amount. In embodiments, the at least one curable liquid component is present in an amount of from about 10 to about 25%, or from about 10 to about 20%, or from about 13.5 to about 16%, by weight based on the total weight of the curable paste ink composition, although the amount can be outside of these ranges. In one specific embodiment, the at least one curable component is present in an amount of less than about 20% by weight based on the total weight of the curable paste ink composition. In another embodiment, the at least one curable component is present in an amount of less than about 16% by weight based on the total weight of the curable paste ink composition. In a particular embodiment, the at least one curable component is present in an amount of from about 13.5 to about 16%, by weight based on the total weight of the curable paste ink composition.

In certain embodiments, the at least one liquid component comprises a combination of difunctional monomer and pentafunctional monomer present in a 1:1 to 1.5:1 ratio of difunctional monomer to pentafunctional monomer, and wherein the total combined amount of difunctional monomer and pentafunctional monomer is from about 13.5 to about 16% by weight based upon the total weight of the curable paste ink compositions.

In certain other embodiments, the at least one liquid component comprises a combination of trifunctional monomer and pentafunctional monomer present in a 1:1 to 1.5:1 ratio of trifunctional monomer to pentafunctional monomer, and wherein the total combined amount of trifunctional and pentafunctional monomer is from about 13.5 to 16% by weight based upon the total weight of the curable paste ink compositions.

In certain embodiments, the at least one liquid component comprises a combination of difunctional monomer and pentafunctional monomer present in a 1:1 ratio of difunctional monomer to pentafunctional monomer, and wherein the total combined amount of difunctional monomer and pentafunctional monomer is about 13.5% by weight based upon the total weight of the curable paste ink compositions.

In certain other embodiments, the at least one liquid component comprises a combination of trifunctional monomer and pentafunctional monomer present in a 1:1 ratio of trifunctional monomer to pentafunctional monomer, and wherein the total combined amount of trifunctional monomer and pentafunctional monomer is about 13.5 to 16% by weight based upon the total weight of the curable paste ink compositions.

In specific embodiments, the curable paste ink compositions herein meet viscosity requirements for jetting at 90° C. and have an initial rate of curing in some embodiments exceeding 200 feet/second, or exceeding 300 feet/second, or, in specific embodiments exceeding 350 feet/second.

The non-curable wax herein can be any suitable non-curable wax component that is a solid at room temperature. By non-curable component, it is meant that the component does not react via free radical polymerization or is not radiation curable or not significantly radiation curable. In embodiments, the non-curable wax can be a member of the group consisting of acid waxes esterified with mono or polyvalent alcohols or blends of acid waxes having different degrees of esterification, and combinations thereof.

In one embodiment, the non curable wax is an ester wax. In another embodiment, the non-curable wax is a derivative of montan wax. In a specific embodiment, the non-curable wax can be LicoWax® KFO, an ester wax available from Clariant.

In embodiments, the compositions contain a curable wax in combination with an ester wax wherein the ester wax has an acid value (mg KOH/g) that is greater than from about 15 to less than about 100, or from about 40 to about 95. Acid value can be measured by methods known to one of skill in the art, such as ASTM standard test method ASTM D 974.

In embodiments, the radiation curable solid ink composition contains a non-curable wax comprising an ester wax having a melting point of from about 40 to about 95° C.

In embodiments, the non-curable wax can be selected from ethoxylated octylphenol derivatives which are soluble in the ink composition and/or have a melting point of about 5° C. to about 10° C. below jetting temperatures (which may range from about 70° C. to about 100° C.) so that the non-curable waxes homogenously combine with the other components of the ink composition. Such octylphenol derivatives are described in U.S. patent application Ser. No. 12/704,194, which is hereby incorporated by reference herein in its entirety. In embodiments, the molecular weight (M) of the ethoxylated octylphenol derivatives range from about 600 to about 5,000 grams/mole. The term "ethoxylated octylphenol derivatives" also refers, for example, to those shown below, and may be prepared using the exemplary methods described below and in U.S. patent application Ser. No. 12/704,194. Mixtures and combinations of the ethoxylated octylphenol derivatives can be selected in embodiments herein.

In a specific embodiment, the ethoxylated octylphenol derivative comprises "Derivative A" of the formula

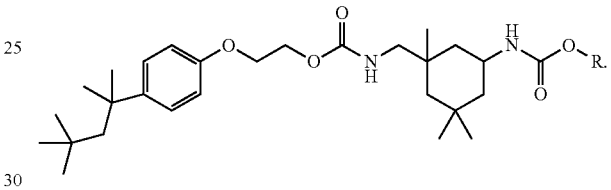

Derivative A can be prepared via the following reaction scheme:

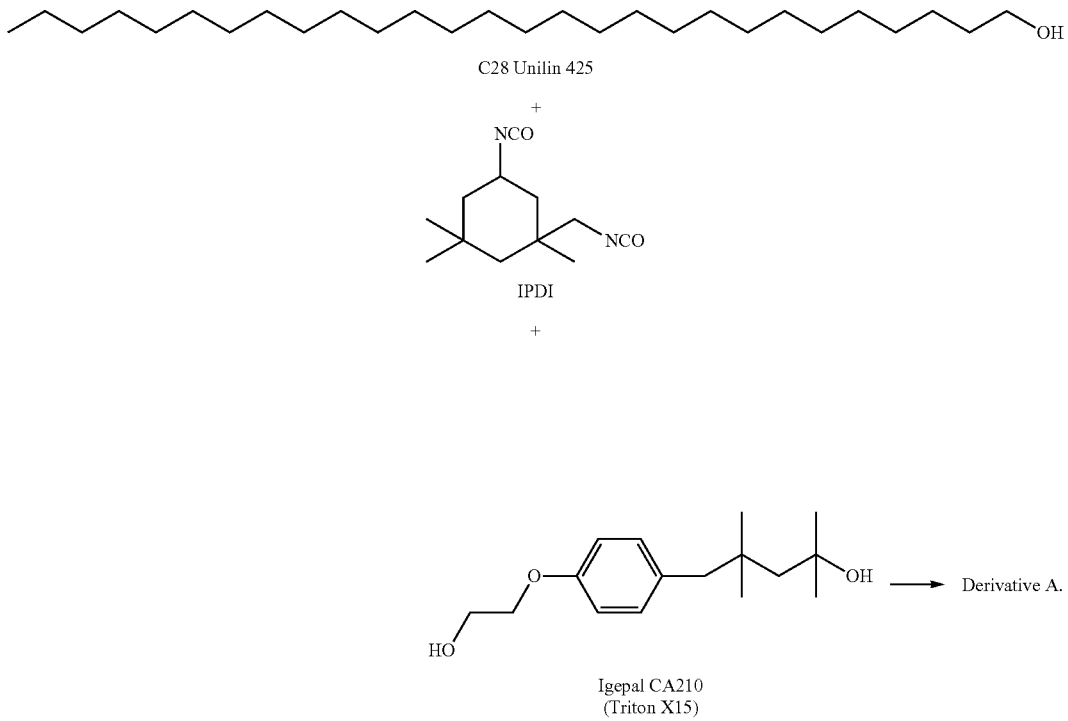

In another specific embodiment, the ethoxylated octylphenol derivative comprises "Derivative B" of the formula:
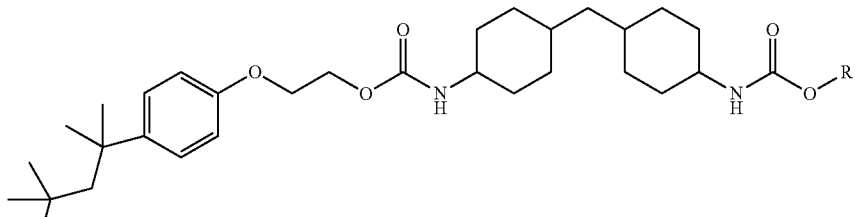
Derivative B can be prepared via the following reaction scheme:
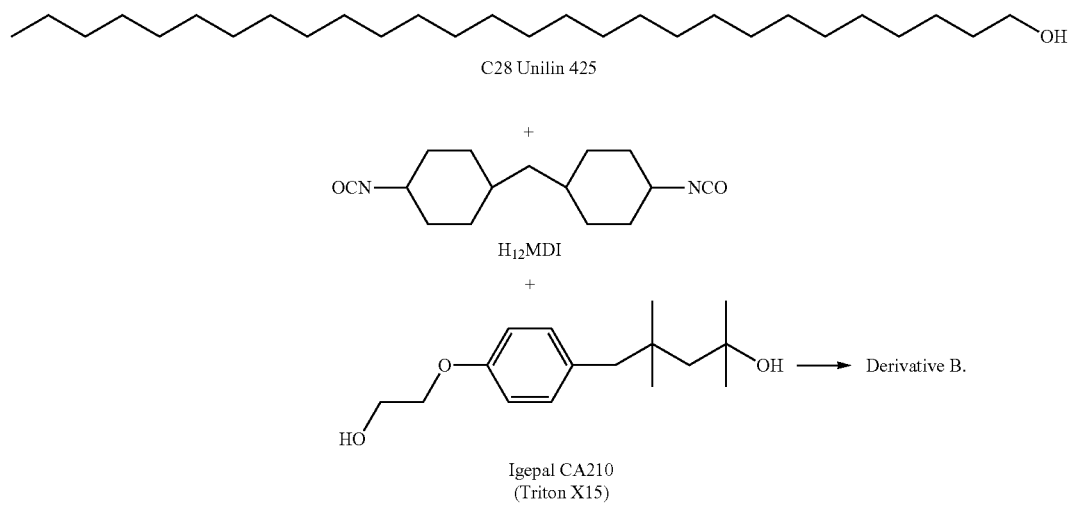
In another specific embodiment, the ethoxylated octylphenol derivative comprises "Derivative C" of the formula:
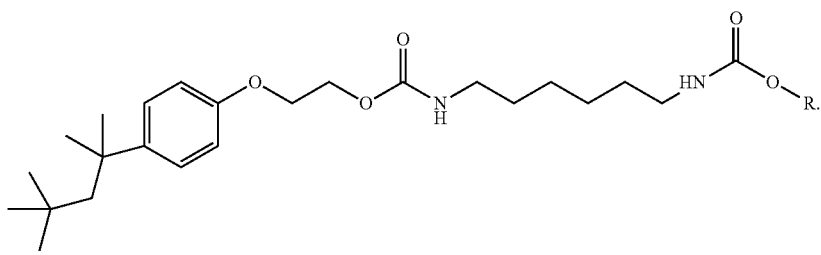
Derivative C can be prepared via the following reaction scheme:
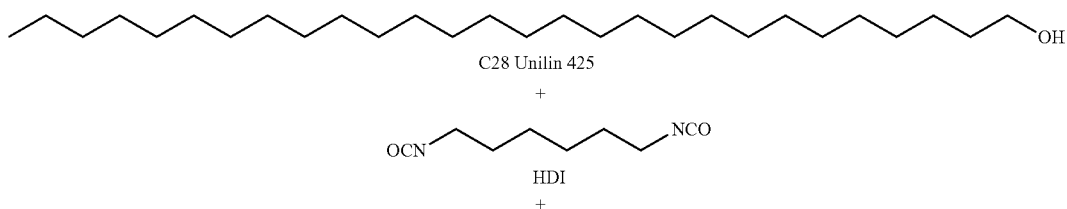

-continued

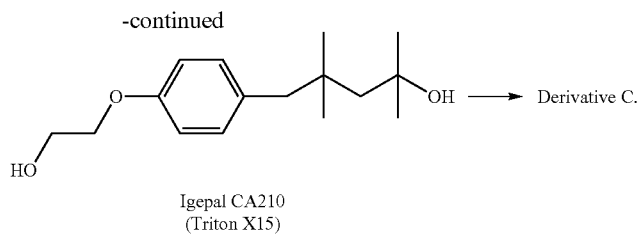

Igepal CA210
(Triton X15)

In another specific embodiment, the ethoxylated octylphenol derivative comprises "Derivative D" of the formula:

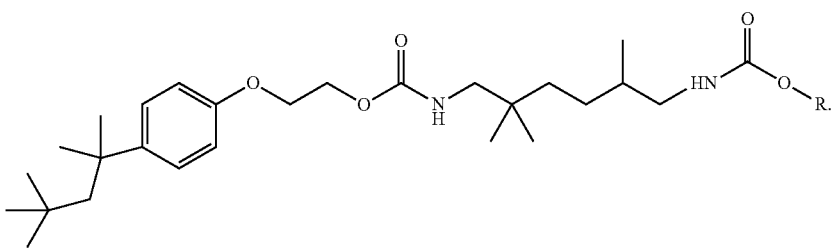

Derivative D can be prepared via the following reaction scheme:

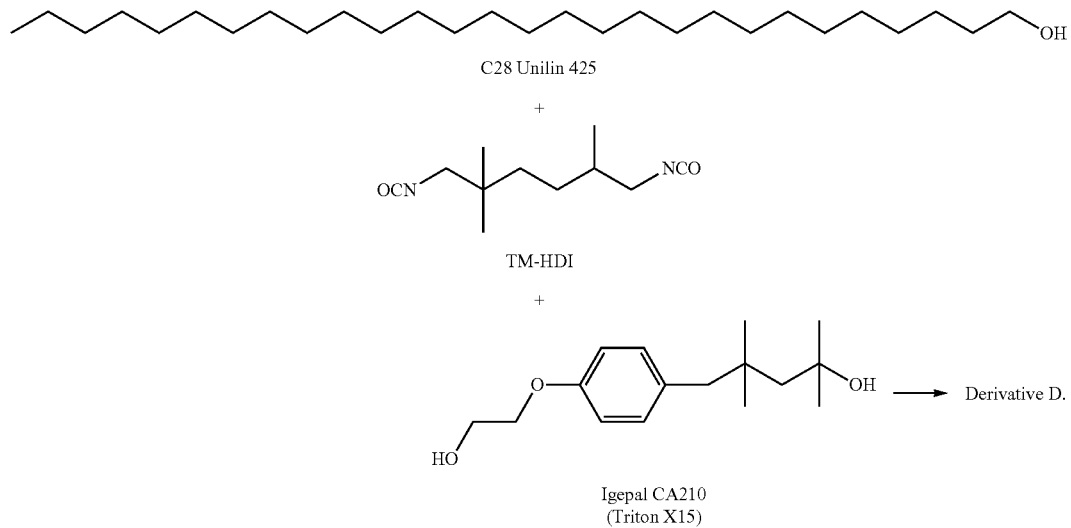

Igepal CA210
(Triton X15)

In the above formulas for Derivatives A, B, C, and D, R is a hydrocarbon chain in which, in embodiments, the number of carbon atoms is from about 18, to about 48, or from about 24 to about 34, or from about 28 to about 30. In embodiments, in the above formulas for Derivatives A, B, C, and D, R is $CH_3—(CH_2)_n—$ where n is an integer of from about 17 to about 47, or from about 23 to about 33, or wherein n is 27, or wherein n is 29. In embodiments, the ethoxylated octylphenol derivatives can be a mixture of ethoxylated octylphenol derivatives of one or more, such as two, three, or four of the above formulas for Derivatives A, B, C, or D, wherein R is $CH_3—(CH_2)_n—$ in which the Derivatives present in the mixture comprise a range of integer values for n. For example, the ethoxylated octylphenol derivative mixture may include as its main component (the term "main component" refers, for example, to the component present in the highest proportion) a molecule of the formula for Derivatives A, B, C, or D, wherein R is $CH_3—(CH_2)_n—$ and n is an integer of from about 17 to about 47, or from about 23 to about 33, or from about 27 to about 29, or wherein n is 27, or wherein n is 29. Further, the breadth of the range of integer values for n making up the distribution of molecules present in the mixture may also vary, such that the mixture of Derivative molecules is made up of molecules having an integer value of n being from about 17 to about 47, from about 23 to about 33, and from about 27 to about 29.

Reactants for the ethoxylated octylphenol derivatives can be any suitable or desired reactants. In embodiments, the reactants can be selected from the Triton® and Igepal® CA series based on octyl phenol ethoxylates, such as Igepal® CA-210 (equivalent to Triton® X-15), Igepal® CA-420 (equivalent to Triton® X-35), Igepal® CA-510 (equivalent to Triton® X-45), Igepal® CA-620 (equivalent to Triton® X-114), Igepal® CA-630 (equivalent to Triton® X-100), Igepal® CA-720 (equivalent to Triton® X-102), Igepal® CA-887 (equivalent to Triton® X-305), Igepal® CA-890 (equivalent to Triton® X-405), Igepal® CA-897 (equivalent to Triton® X-705), as well as Igepal® CO series (based on nonylphenol ethoxylation) such as Igepal® CO210, CO520, CO630, CO720, CO890, and Igepal® DM970 based on dinonylphenol ethoxylates.

The ethoxylated octylphenol derivatives can be prepared by mixing specific reactive components, for example, an ethoxylated octylphenol, a linear alcohol, and a diisocyanate and/or a polyisocyanate. These reactive components can include a linear alcohol having 28 or 38 carbon atoms, sold under the tradename Unilin® 425; ethoxylated octylphenols, such as Igepal® CA-210, Igepal® CA-420, Igepal® CA-520, Igepal® CA-620, Igepal® CA-630, Igepal® CA-720 (ethoxylated octylphenols sold under the tradename IGEPAL®, formerly manufactured by Rhone-Poulenc Co., and currently manufactured by Rhodia; the Triton® series formerly manufactured by Union Carbide, and currently manufactured by the Dow Chemical Company); diisocyanates and polyisocyanates, including aromatic, aliphatic, cycloaliphatic and/or (cyclo)aliphatic diisocyanates and/or polyisocyanates. Suitable aliphatic diisocyanates or polyisocyanates can have 3 to 16 carbon atoms or 4 to 12 carbon atoms, in the linear or branched alkyl portion, and suitable cycloaliphatic or (cyclo)aliphatic diisocyanates can have 4 to 18 carbon atoms, or 6 to 15 carbon atoms, in the cycloalkyl portion. The term "(cyclo)aliphatic diisocyanates" refers, for example, to NCO groups that are attached cyclically and aliphatically at the same time (such as isophorone diisocyanate); and cycloaliphatic diisocyanates include those which contain only NCO groups attached directly to the cycloaliphatic ring, such as $H_{12}MDI$.

Suitable diisocyanates and polyisocyanates include, for example, isophorone diisocyanate (IPDI); diisocyanatodicyclohexylmethane ($H_{12}MDI$); hexamethylene diisocyanate (HDI); 2,2,4-trimethylhexamethylene diisocyanate/2,4,4-trimethylhexamethylene diisocyanate (TMOHDI); 2-methylpentane diisocyanate (MPDI); norbornane diisocyanate (NBDI); phenylene 1,3- and 1,4-diisocyanate; naphthylene 1,5-diisocyanate; toluidine diisocyanate; tolylene 2,6-diisocyanate; tolylene 2,4-diisocyanate (2,4-TDI); diphenylmethane 2,4'-diisocyanate (2,4'-MDI); diphenylmethane 4,4'-diisocyanate; the mixtures of monomeric diphenylmethane diisocyanates (MDI) and oligomeric diphenylmethane diisocyanates (polymer MDI); xylylene diisocyanate; tetramethylxylylene diisocyanate (TMXDI); triisocyanatotoluene; cyclohexane diisocyanate; methylcyclohexane diisocyanate; ethylcyclohexane diisocyanate; propylcyclohexane diisocyanate; methyldiethylcyclohexane diisocyanate; propane diisocyanate; butane diisocyanate; pentane diisocyanate; hexane diisocyanate; heptanes diisocyanate; octane diisocyanate; nonane diisocyanate; nonane triisocyanate, such as 4-isocyanatomethyloctane 1,8-diisocyanate (TIN); decane diisocyanate and triisocyanate; undecane diisocyanate and triisocyanate; dodecane diisocyanates and triisocyanates; 4-methylcyclohexane 1,3-diisocyanate; 2-butyl-2-ethylpentamethylene diisocyanate; 3(4)-isocyanatomethyl-1-methylcyclohexyl isocyanate; 2-isocyanatopropylcyclohexyl isocyanate; methylenebis-(cyclohexyl) 2,4'-diisocyanate; 1,4-diisocyanato-4-methylpentane; and mixtures thereof.

The non-curable wax can be present in any suitable amount. In embodiments, the non curable wax can be present in an amount of from about 1 to about 50%, or from about 5 to about 40%, or from about 10 to about 30%, by weight based upon the total weight of the curable solid overcoat composition. In one embodiment, the non curable wax can be present in an amount of from about 20 to about 50% by weight, based upon the total weight of the curable solid ink composition. In another embodiment, the non-curable wax can be an ethoxylated octylphenol derivative or mixture of ethoxylated octylphenol derivatives present in an amount of from about 0 to about 40% by weight, based upon the total weight of the curable solid ink composition.

In embodiments, the radiation curable solid ink composition forms a semi-solid state at an intermediate temperature between a jetting temperature and a substrate temperature and wherein the radiation curable solid ink composition remains in a liquid or semi-solid state for a period of time prior to solidification on the substrate. In other embodiments, the radiation curable solid ink compositions herein are slow to solidify when cooling from the melt temperature, thus forming a semi-solid state at an intermediate temperature between the jetting temperature and the substrate temperature thus enabling controlled spreading or pressure fusing of the compositions upon printing.

In embodiments, at room temperature, the paste is deformable with a minimum stress of 50 pounds per square inch (psi), or a minimum of 35 psi, or in a specific embodiment a minimum stress of 10 psi. In embodiments, the radiation curable solid ink composition forms a semi-solid state that is deformable with a stress that is a minimum of 2 psi less than the stress needed at room temperature at an intermediate temperature wherein the intermediate temperature is between a jetting temperature (in embodiments, 50° C. to about 110° C. or from about 60° C. to about 100° C.) and a substrate temperature (in embodiments, about 80° C. or below, more specifically from about 0° C. to 50° C., the temperature at the substrate being less than the jetting temperature) and wherein the radiation curable solid ink composition remains in a liquid or semi-solid state for a period of time prior to solidification on the substrate.

In certain embodiments, a component rate of crystallization or solidification can be altered in a mixture thus providing conditions where the radiation curable solid ink composition remains in a liquid or semi-solid state for a period of time prior to solidification, thereby providing a solid ink that can be melted so as to enable jetting, having a slow crystallization rate such that the ink remains in a semi-solid state on the paper thereby positively affecting curing performance.

Radiation curable as used herein is intended to cover all forms of curing upon exposure to a radiation source, including light and heat sources and including in the presence or absence of initiators. Example radiation curing routes include, but are not limited to, curing using ultraviolet (UV) light, for example having a wavelength of from about 200 to about 400 nanometers, or more rarely visible light, preferably in the presence of photoinitiators and/or sensitizers, curing using e-beam radiation, in embodiments in the absence of photoinitiators, curing using thermal curing, in the presence or absence of high temperature thermal initiators (and which are in embodiments largely inactive at the jetting temperature), and appropriate combinations thereof.

In embodiments, the radiation curable paste ink composition comprises a photoinitiator that initiates polymerization of curable components of the ink, including the curable monomer and the curable wax. The initiator should be solid at room temperature and soluble in the composition at jetting temperature. In specific embodiments, the initiator is an ultraviolet radiation activated photoinitiator.

In embodiments, the initiator is a radical initiator. Examples of suitable radical photoinitiators include, but are not limited to, ketones such as benzyl ketones, monomeric hydroxyl ketones, polymeric hydroxyl ketones, and α-amino ketones; acyl phosphine oxides, metallocenes, benzophenones and benzophenone derivatives, such as 2,4,6-trimethylbenzophenone and 4-methylbenzophenone; and thioxanthenones, such as 2-isopropyl-9H-thioxanthen-9-one. A specific ketone is 1-[4-(2-hydroxyethoxy)-phenyl]-2-hydroxy-2-methyl-1-propane-1-one. In a specific embodiment, the ink contains an α-amino ketone, 1-[4-(2-hydroxyethoxy)-phenyl]-2-hydroxy-2-methyl-1-propane-1-one and 2-isopropyl-9H-thioxanthen-9-one.

In a specific embodiment, the photoinitiator comprises a mixture of 2-isopropylthioxanthone and 2-isopropylthioxanthone, 2-methyl-1[4-(methylthio)phenyl]-2-morpholinopropan-1-one, or a mixture or combination thereof.

In another embodiment, the photoinitiator comprises at least one of bis acyl phosphine photoinitiator comprising bis(2,4,6-trimethyl benzoyl)-phenylphosphineoxide, melting point 127 to 133° C., available from Ciba Specialty Chemicals as Irgacure® 819, α-hydroxy ketone photoinitiator comprising 1-hydroxy-cyclohexyl-phenyl-ketone, melting, point 45 to 49° C., available from Ciba Specialty Chemicals as Irgacure® 184, α-amino-ketone photoinitiator comprising 2-methyl-1[4-(methylthio)phenyl]-2-morpholinopropan-1-one, melting point 70 to 75° C., available from Ciba Specialty Chemicals as Irgacure® 907, or a mixture or combination thereof.

In a specific embodiment, the radiation curable paste ink composition comprises a three-component photoinitiator system with no synergist. U.S. Pat. No. 6,896,937 discloses a radiation-curable hot melt ink composition comprising a colorant, a polymerizable monomer and a photoinitiating system comprising 0.5 to 1.5% by weight of an aromatic ketone photoinitiator, 2 to 10% by weight of an amine synergist, 3 to 8% by weight of a second photoinitiator that is different than the aromatic ketone photoinitiator and capable of undergoing alpha cleavage, and 0.5 to 1.5% by weight of a photosensitizer. U.S. Pat. No. 6,896,937 also discloses liquid curable ink compositions and compositions with liquid diluents, which inks are not solids at room temperature. U.S. Pat. No. 7,322,688 discloses a method of inkjet printing curable inks which inks are polymerized by a cationic photoinitiating system.

In other embodiments, the initiator is a cationic initiator. Examples of suitable cationic photoinitiators include, but are not limited to, aryldiazonium salts, diaryliodonium salts, triarysulfonium salts, triarylselenonium salts, dialkylphenacylsulfonium salts, triarylsulphoxonium salts and aryloxydiarylsulfonium salts.

The initiator can be present in any effective amount. In embodiments, the initiator is present in an amount of from about 0.5 to about 15% or from about 1 to about 10%, by weight based upon the total weight of the curable solid ink composition.

Any suitable or desired gellant can be used in the present radiation curable paste compositions. In embodiments, the gellant is a curable gellant comprising a curable amide, a curable polyamide-epoxy acrylate component, and a polyamide component. In other embodiments, the gellant is a curable composite gellant comprising a curable epoxy resin and a polyamide resin. The gellant can also comprise mixtures of different gellants. Inclusion of the gellant in the curable paste ink composition permits the composition to be applied over a substrate, such as on one or more portions of the substrate and/or on one or more portions of an image previously formed on the substrate, without excessive penetration into the substrate because the viscosity of the composition is quickly increased as the composition cools to a solid or paste following application. Excessive penetration of the molten curable solid ink into a porous substrate such as paper can lead to an undesirable decrease in the substrate opacity. The curable gellant can also participate in the curing of monomer(s) of the composition.

In embodiments, the gellant comprises a curable epoxy-polyamide composite gellant derived from an epoxy group-containing component comprising at least one of polyphenol-based epoxy resins, polyol-based epoxy resins or fatty acid epoxides, and a polyamide component. See, for example, U.S. Patent Publication 2008/0122914, which is hereby incorporated by reference herein in its entirety.

In other embodiments, the gellant comprises a compound of the formula

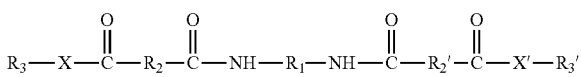

wherein $R_1$ is (i) an alkylene group, including linear and branched, saturated and unsaturated, cyclic and acyclic, and substituted and unsubstituted alkylene groups, and wherein heteroatoms either may or may not be present in the alkylene group, (ii) an arylene group, including substituted and unsubstituted arylene groups, and wherein heteroatoms either may or may not be present in the arylene group, (iii) an arylalkylene group, including substituted and unsubstituted arylalkylene groups, wherein the alkyl portion of the arylalkylene group can be linear or branched, saturated or unsaturated, and cyclic or acyclic, and wherein heteroatoms either may or may not be present in either the aryl or the alkyl portion of the arylalkylene group, or (iv) an alkylarylene group, including substituted and unsubstituted alkylarylene groups, wherein the alkyl portion of the alkylarylene group can be linear or branched, saturated or unsaturated, and cyclic or acyclic, and wherein heteroatoms either may or may not be present in either the aryl or the alkyl portion of the alkylarylene group, $R_2$ and $R_2'$ each, independently of the other, are (i) alkylene groups, including linear and branched, saturated and unsaturated, cyclic and acyclic, and substituted and unsubstituted alkylene groups, and wherein heteroatoms either may or may not be present in the alkylene group, (ii) arylene groups, including substituted and unsubstituted arylene groups, and wherein heteroatoms either may or may not be present in the arylene group, (iii) arylalkylene groups, including substituted and unsubstituted arylalkylene groups, wherein the alkyl portion of the arylalkylene group can be linear or branched, saturated or unsaturated, and cyclic or acyclic, and wherein heteroatoms either may or may not be present in either the aryl or the alkyl portion of the arylalkylene group, or (iv) alkylarylene groups, including substituted and unsubstituted alkylarylene groups, wherein the alkyl portion of the alkylarylene group can be linear or branched, saturated or unsaturated, and cyclic or acyclic, and wherein heteroatoms either may or may not be present in either the aryl or the alkyl portion of the alkylarylene group, $R_3$ and $R_3'$ each, independently of the other, are either (a) photoinitiating groups, or (b) groups which are (i) alkyl groups, including linear and branched, saturated and unsaturated, cyclic and acyclic, and substituted and unsubstituted alkyl groups, and wherein heteroatoms either may or may not be present in the alkyl group, (ii) aryl groups, including substituted and unsubstituted aryl groups, wherein heteroatoms either may or may not be present in the aryl group, (iii) arylalkyl groups, including substituted and unsubstituted arylalkyl groups, wherein the alkyl portion of the arylalkyl group can be linear or branched, saturated or unsaturated, and cyclic or acyclic, and wherein heteroatoms either may or may not be present in either the aryl or the alkyl portion of the arylalkyl group, or (iv) alkylaryl groups, including substituted and unsubstituted alkylaryl groups, wherein the alkyl portion of the alkylaryl group can be linear or branched, saturated or unsaturated, and cyclic or acyclic, and wherein heteroatoms either may or may not be present in either the aryl or the alkyl portion of the alkylaryl group, and X and X' each, independently of the other, is an oxygen atom or a group of the formula —$NR_4$—, wherein $R_4$ is (i) a hydrogen atom, (ii) an alkyl group, including linear and branched, saturated and unsaturated, cyclic and acyclic, and substituted and unsubstituted alkyl groups, and wherein heteroatoms either may or may not be present in the alkyl group, (iii) an aryl group, including substituted and unsubstituted aryl groups, and wherein heteroatoms either may or may not be present in the aryl group, (iv) an arylalkyl group, including substituted and unsubstituted arylalkyl groups, wherein the alkyl portion of the arylalkyl group can be linear or branched, saturated or unsaturated, and cyclic or acyclic, and wherein heteroatoms either may or may not be present in either the aryl or the alkyl portion of the arylalkyl group, or (v) an alkylaryl group, including substituted and unsubstituted alkylaryl groups, wherein the alkyl portion of the alkylaryl group can be linear or branched, saturated or unsaturated, and cyclic or acyclic, and wherein heteroatoms either may or may not be present in either the aryl or the alkyl portion of the alkylaryl group. See, for example, U.S. Pat. No. 7,279,587, which is hereby incorporated by reference herein in its entirety. See also, U.S. Patent Publication 2010/0242790A1, which is hereby incorporated by reference herein in its entirety.

In a specific embodiment, the gellant is a statistical mixture of components that further includes a non-curable analogue. In embodiments, the melting transition of the gellant is from about 60° C. to about 80° C. In embodiments, the gellant is a mixture of

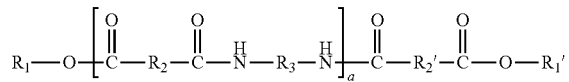

wherein $R_1$ and $R_1'$ each, independently of the other, is (i) an alkyl group having at least one ethylenic unsaturation therein, which can be linear or branched, cyclic or acyclic, and substituted or unsubstituted alkyl groups, and wherein hetero atoms either may or may not be present in the alkyl group, (ii) an arylalkyl group having at least one ethylenic unsaturation therein, which can be substituted or unsubstituted arylalkyl groups, wherein the alkyl portion of the arylalkyl group can be linear or branched, cyclic or acyclic, and substituted or unsubstituted, and wherein hetero atoms either may or may not be present in either the aryl or the alkyl portion of the arylalkyl group, or (iii) an alkylaryl group having at least one ethylenic unsaturation therein, which can be substituted or unsubstituted alkylaryl groups, wherein the alkyl portion of the alkylaryl group can be linear or branched, cyclic or acyclic, and substituted or unsubstituted, and wherein hetero atoms either may or may not be present in either the aryl or the alkyl portion of the alkylaryl group, $R_2$ and $R_2'$ each, independently of the other, are (i) alkylene groups, which can be linear or branched, saturated or unsaturated, cyclic or acyclic, and substituted or unsubstituted alkylene groups, and wherein hetero atoms either may or may not be present in the alkylene group, (ii) arylene groups, which can be substituted or unsubstituted arylene groups, and wherein hetero atoms either may or may not be present in the arylene group, (iii) arylalkylene groups, which can be substituted or unsubstituted aryalkylene groups, wherein the alkyl portion of the arylalkylene group can be linear or branched, saturated or unsaturated, cyclic or acyclic, and substituted or

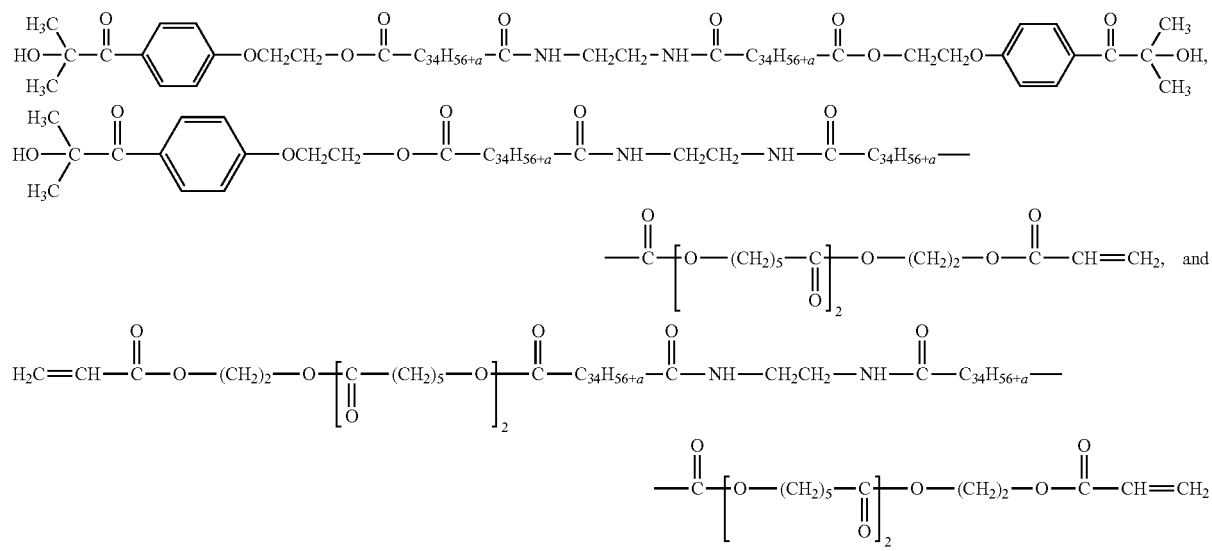

wherein —$C_{34}H_{56+a}$— represents a branched alkylene group, which may or may not include unsaturations and cyclic groups, substituted and unsubstituted alkylene groups, and wherein heteroatoms either may or may not be present in the alkylene group, wherein a is an integer of 0, 1, 2, 3, 4, 5, 6, 7, 8, 9, 10, 11, or 12.

In other embodiments, the gellant is a compound of the formula unsubstituted, and wherein hetero atoms either may or may not be present in either the aryl or the alkyl portion of the arylalkylene group, or (iv) alkylarylene groups, which can be substituted or unsubstituted alkylarylene groups, wherein the alkyl portion of the alkylarylene group can be linear or branched, saturated or unsaturated, cyclic or acyclic, and substituted or unsubstituted, and wherein hetero atoms either may or may not be present in either the aryl or the alkyl portion of the alkylarylene group, $R_3$ is (i) a linear or branched alkylene group, which can be saturated or unsaturated, and substituted and unsubstituted alkylene groups, and wherein hetero atoms either may or may not be present in the alkylene group, (ii) an arylene group, which can be substituted or unsubstituted arylene groups, and wherein hetero atoms either may or may not be present in the arylene group, (iii) an arylalkylene group, which can be substituted or unsubstituted arylalkylene groups, wherein the alkyl portion of the arylalkylene group can be linear or branched, saturated or unsaturated, cyclic or acyclic, and substituted or unsubstituted, and wherein hetero atoms either may or may not be present in either the aryl or the alkyl portion of the arylalkylene group, or (iv) an alkylarylene group, which can be substituted or unsubstituted alkylarylene groups, wherein the alkyl portion of the alkylarylene group can be linear or branched, saturated or unsaturated, cyclic or acyclic, and substituted or unsubstituted, and wherein hetero atoms either may or may not be present in either the aryl or the alkyl portion of the alkylarylene group, and n is an integer representing the number of repeat amide units and is at least 1. See, for example, U.S. Pat. No. 7,276,614, which is hereby incorporated by reference herein in its entirety.

In certain embodiments, the gellant is a mixture of compounds of the formula

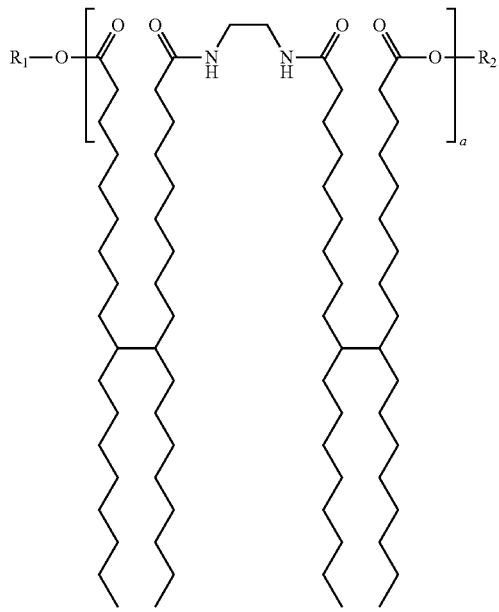

wherein, in embodiments, $R_1$ is a compound, A, of the formula

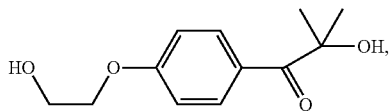

wherein $R_2$ is a compound, B, of the formula

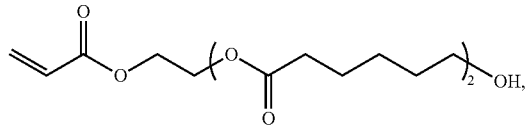

and wherein n is an integer of from about 1 to about 4. In specific embodiments, the gellant is a 1:2:1 mixture of $R_1=R_2=A:R_1=B:R_2=R_2=B$. Numerous other suitable options for $R_1$ and $R_2$ having the appropriate rheological properties can be selected in embodiments herein, such as those gellants described in U.S. Patent Application 2008/0122914, U.S. Pat. Nos. 7,276,614, and 7,279,587, incorporated by reference hereinabove.

In embodiments, the gellant may be one of the aromatic end-capped gellants described in U.S. patent application Ser. No. 12/765,148 of Chopra et al. filed on Apr. 22, 2010, which is hereby incorporated by reference in its entirety. In embodiments, the gellant can comprise compound of the formula

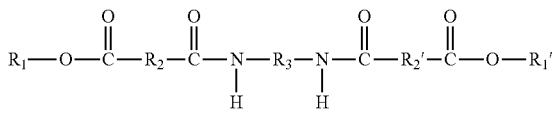

wherein $R_1$ and $R_{1'}$ can be the same or different, and wherein $R_1$ and $R_{1'}$ each, independently of the other is (i) an alkyl group having a least one ethylenic unsaturation therein, which can be linear or branched, cyclic or acyclic, and substituted or unsubstituted alkyl groups, and wherein hetero atoms may optionally be present in the alkyl group, (ii) an arylalkyl group having at least one ethylenic unsaturation therein, which can be substituted or unsubstituted arylalkyl groups, wherein the alkyl portion of arylalkyl group can be linear or branched, cyclic or acyclic, and substituted or unsubstituted, and wherein hetero atoms may optionally be present in either the aryl portion or the alkyl portion of the arylalkyl group, (iii) an alkylaryl group having at least one ethylenic unsaturation therein, which can be substituted or unsubstituted alkylaryl groups, wherein the alkyl portion of the alkylaryl group can be linear or branched, cyclic or acyclic, and substituted or unsubstituted, and wherein hetero atoms may optionally be present in either the aryl or the alkyl portion of the alkylaryl group, or (iv) an aromatic group, provided that at least one of $R_1$ and $R_{1'}$ is an aromatic group; and provided that neither of $R_1$ or $R_{1'}$ is a photoinitiator group;

wherein $R_2$ and $R_{2'}$ are the same or different, and wherein $R_2$ and $R_{2'}$ are each independently selected from (i) alkylene groups, which can be linear or branched, saturated or unsaturated, cyclic or acyclic, substituted or unsubstituted alkylene groups, and wherein hetero atoms may optionally be present in the alkylene group; (ii) arylene groups, which can be substituted or unsubstituted arylene groups, and wherein hetero atoms may optionally be present in the arylene group; (iii) arylalkylene groups, which can be substituted or unsubstituted arylalkylene groups, wherein the alkyl portion of the arylalkylene group can be linear or branched, saturated or unsaturated, cyclic or acyclic, and substituted or unsubstituted, and wherein hetero atoms may optionally be present in either the aryl portion or the alkyl portion of the arylalkylene group; or (iv) alkylarylene groups, which can be substituted or unsubstituted alkylarylene groups, wherein the alkyl portion of the alkylarylene group can be linear or branched, saturated or unsaturated, cyclic or acyclic, and substituted or unsubstituted, and wherein hetero atoms may optionally be present in either the aryl portion or the alkyl portion of the alkylarylene group; and wherein $R_3$ is (i) a linear or branched alkylene group, which can be saturated or unsaturated, and substituted or unsubstituted alkylene groups, and wherein hetero atoms may optionally be present in the alkylene group; (ii) an arylene group, which can be substituted or unsubstituted arylene groups, and wherein hetero atoms may optionally be present in the arylene group; (iii) an arylalkylene group, which can be substituted or unsubstituted arylalkylene groups, wherein the alkyl portion of the arylalkylene group can be linear or branched, saturated or unsaturated, cyclic or acyclic, and substituted or unsubstituted, and wherein hetero atoms may optionally be present in either the aryl portion or the alkyl portion of the arylalkylene group; or (iv) an alkylarylene group, which can be substituted or unsubstituted alkylarylene groups, wherein the alkyl portion of the alkylarylene group can be linear or branched, saturated or unsaturated, cyclic or acyclic, and substituted or unsubstituted, and where hetero atoms may optionally be present in either the aryl portion or the alkyl portion of the alkylarylene group.

In embodiments, the gellants of the ink may be compounds with the following general structures

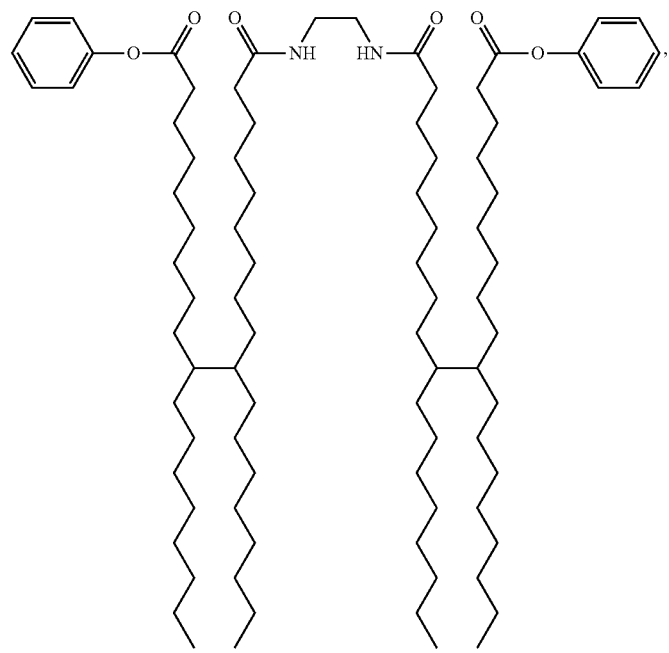

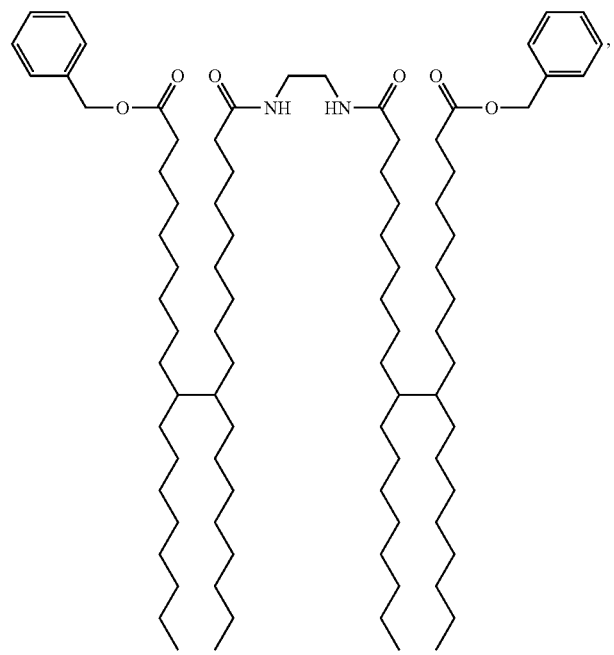

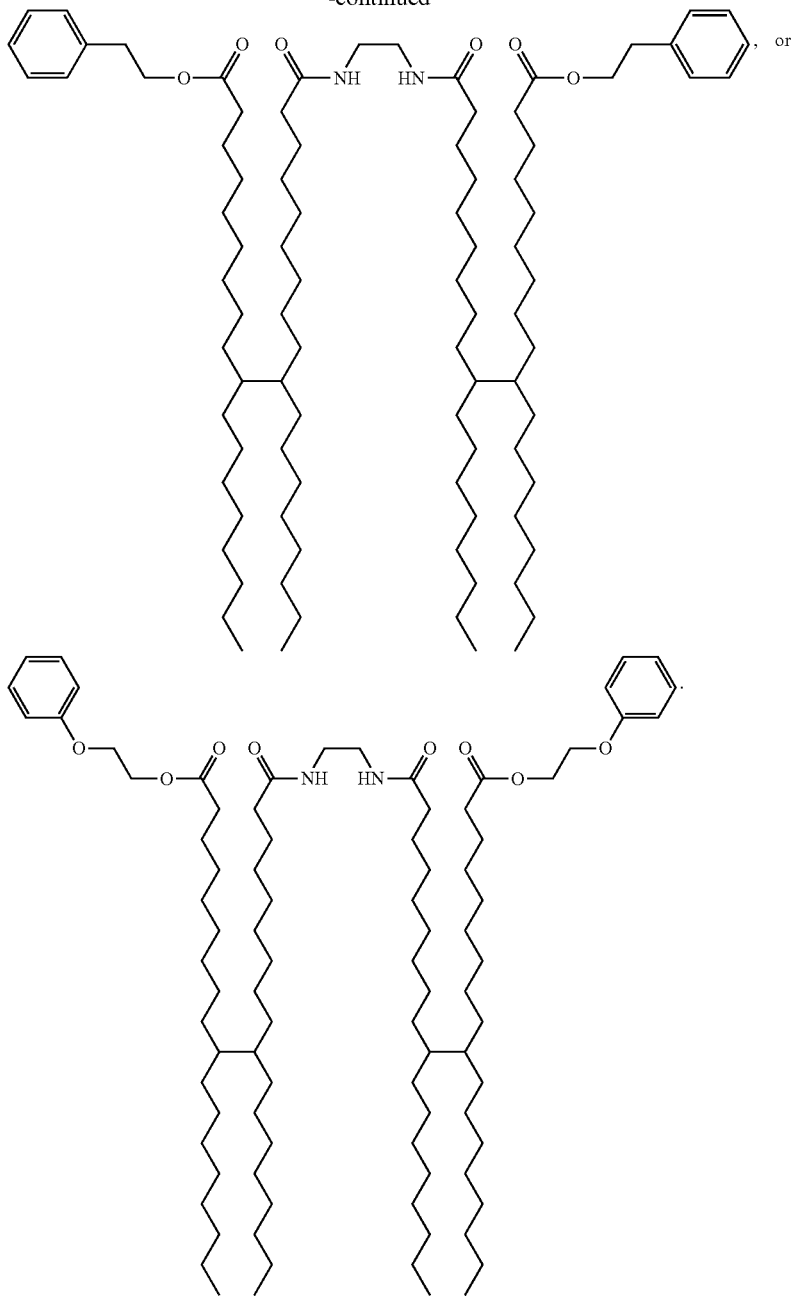

The gellant can be present in any suitable or desired amount, such as from about 1 percent to about 50 percent, or from about 2 percent to about 20 percent, or from about 5 percent to about 15 percent by weight of the ink.

Any desired or effective colorant can be employed in the inks, including dyes, pigments, mixtures thereof, and the like, provided that the colorant can be dissolved or dispersed in the ink vehicle. The compositions can be used in combination with conventional ink colorant materials, such as Color Index (C.I.) Solvent Dyes, Disperse Dyes, modified Acid and Direct Dyes, Basic Dyes, Sulphur Dyes, Vat Dyes, and the like.

In embodiments, the colorant comprises a dye, a pigment, a curable olefin colorant, or a mixture thereof. Examples of suitable dyes include, but are not limited to, Usharect Blue 86 (Direct Blue 86), available from Ushanti Colour; Intralite Turquoise 8GL (Direct Blue 86), available from Classic Dyestuffs; Chemictive Brilliant Red 7BH (Reactive Red 4), available from Chemiequip; Levafix Black EB, available from Bayer; Reactron Red $H_8B$ (Reactive Red 31), available from Atlas Dye-Chem; D&C Red #28 (Acid Red 92), available from Warner-Jenkinson; Direct Brilliant Pink B, available from Global Colors; Acid Tartrazine, available from Metrochem Industries; Cartasol Yellow 6GF, available from Clariant; Carta Blue 2GL, available from Clariant; solvent dyes, including spirit soluble dyes such as Neozapon Red 492 (BASF); Orasol Red G (Ciba); Direct Brilliant Pink B (Global Colors); Aizen Spilon Red C-BH (Hodogaya Chemical); Kayanol Red 3BL (Nippon Kayaku); Spirit Fast Yellow 3G; Aizen Spilon Yellow C-GNH (Hodogaya Chemical); Cartasol Brilliant Yellow 4GF (Clariant); Pergasol Yellow CGP (Ciba); Orasol Black RLP (Ciba); Savinyl Black RLS (Clariant); Morfast Black Conc. A (Rohm and Haas); Orasol Blue GN (Ciba); Savinyl Blue GLS (Sandoz); Luxol Fast Blue MBSN (Pylam); Sevron Blue 5GMF (Classic Dyestuffs); Basacid Blue 750 (BASF); Neozapon Black X51 [C.I. Solvent Black, C.I. 12195] (BASF); Sudan Blue 670 [C.I. 61554] (BASF); Sudan Yellow 146 [C.I. 12700] (BASF); Sudan Red 462 [C.I. 260501] (BASF); and the like, as well as mixtures thereof.

In embodiments, the colorant is a pigment. Examples of suitable pigments include PALIOGEN Violet 5100 (BASF); PALIOGEN Violet 5890 (BASF); HELIOGEN Green L8730 (BASF); LITHOL Scarlet D3700 (BASF); SUNFAST® Blue 15:4 (Sun Chemical); Hostaperm Blue B2G-D (Clariant); Permanent Red F7RK; Hostaperm Violet BL (Clariant); LITHOL Scarlet 4440 (BASF); Bon Red C (Dominion Color Company); ORACET Pink RF (Ciba); PALIOGEN Red 3871K (BASF); SUNFAST® Blue 15:3 (Sun Chemical); PALIOGEN Red 3340 (BASF); SUNFAST® Carbazole Violet 23 (Sun Chemical); LITHOL Fast Scarlet L4300 (BASF); SUNBRITE Yellow 17 (Sun Chemical); HELIOGEN Blue L6900, L7020 (BASF); SUNBRITE Yellow 74 (Sun Chemical); SPECTRA PAC® C Orange 16 (Sun Chemical); HELIOGEN Blue K6902, K6910 (BASF); SUNFAST® Magenta 122 (Sun Chemical); HELIOGEN Blue D6840, D7080 (BASF); Sudan Blue OS (BASF); NEOPEN Blue FF4012 (BASF); PV Fast Blue B2GO1 (Clariant); IRGALITE Blue BCA (Ciba); PALIOGEN Blue 6470 (BASF); Sudan Orange G (Aldrich), Sudan Orange 220 (BASF); PALIOGEN Orange 3040 (BASF); PALIOGEN Yellow 152, 1560 (BASF); LITHOL Fast Yellow 0991K (BASF); PALIOTOL Yellow 1840 (BASF); NOVOPERM Yellow FGL (Clariant); Lumogen Yellow D0790 (BASF); Suco-Yellow L1250 (BASF); Suco-Yellow D1355 (BASF); Suco Fast Yellow D1355, DI 351 (BASF); HOSTAPERM Pink E 02 (Clariant); Hansa Brilliant Yellow 5GX03 (Clariant); Permanent Yellow GRL 02 (Clariant); Permanent Rubine L6B 05 (Clariant); FANAL Pink D4830 (BASF); CINQUASIA Magenta (DU PONT); PALIOGEN Black L0084 (BASF); Pigment Black K801 (BASF); and carbon blacks such as REGAL 330™ (Cabot), Carbon Black 5250, Carbon Black 5750 (Columbia Chemical), and the like, as well as mixtures thereof.

The colorant is present in any desired or effective amount to obtain the desired color or hue, such as from about 0.1 to about 15%, or from about 0.2 to about 8%, by weight based upon the total weight of the curable paste ink composition.

The ink may contain optional additives. Optional additives include, but are not limited to, surfactants, light stabilizers, UV absorbers, which absorb incident UV radiation and convert it to heat energy that is ultimately dissipated, antioxidants, optical brighteners, which can improve the appearance of the image and mask yellowing, thixotropic agents, dewetting agents, slip agents, foaming agents, antifoaming agents, flow agents, waxes, oils, plasticizers, binders, electrical conductive agents, fungicides, bactericides, organic and/or inorganic filler particles, leveling agents, e.g., agents that create or reduce different gloss levels, opacifiers, antistatic agents, dispersants, and the like. In particular, the composition may include, as a stabilizer, a radical scavenger, such as Irgastab® UV 10 (Ciba Specialty Chemicals, Inc.). The composition may also include an inhibitor, preferably a hydroquinone, to stabilize the composition by prohibiting or, at least, delaying, polymerization of the oligomer and monomer components during storage, thus increasing the shelf life of the composition. However, additives may negatively affect cure rate, and thus care must be taken when formulating a composition using optional additives.

Optional additives may be present in any suitable amount. In embodiments, the total amount of other additives may be from about 0.1 to about 15% or from about 0.5 to about 10%, by weight based upon the total weight of the curable solid ink composition.

The inks described herein may be applied to a substrate to form an image. In embodiments, the method comprises providing a curable paste ink composition described herein at a first temperature; applying, such as jetting, the radiation curable ink to the substrate in an imagewise fashion to form an image, the substrate being at a second temperature, which is below the first temperature; and exposing the radiation curable ink to radiation to cure the ink. During the curing process, the curable monomer, curable wax, and curable gellant, optionally with other curable components, are polymerized to form a cured image.

In a specific embodiment, the composition is applied by ink jet printing. The inks described herein are preferably jetted at temperatures of about 50° C. to about 110° C. or from about 60° C. to about 100° C. The jetting temperature must be within the range of thermal stability of the composition, to prevent premature polymerization in the print head. At jetting, the inks have a viscosity of from about 5 mPa-s to about 25 mPa-s or about 9 mPa-s to about 13 mPa-s. The inks are thus ideally suited for use in piezoelectric ink jet devices.

However, the substrate to which the inks are applied could be at a temperature at which the ink has a higher viscosity, such as a viscosity of from $10^2$ to $10^7$ mPa-s. For example, the substrate may be maintained at a temperature of about 80° C. or below, more specifically from about 0° C. to 50° C., the temperature at the substrate being less than the jetting temperature. In a specific embodiment, the substrate temperature is at least 10° C. below the first temperature or the substrate temperature is from 10 to 50° C. below the jetting temperature.

By jetting the ink at a temperature at which the ink is a liquid and having the substrate at the temperature at which the ink has a higher viscosity, a phase change can be provided. This phase change may prevent the composition from rapidly soaking into the substrate, avoiding or at least minimizing showthrough. In addition, the ink while on the substrate is exposed to radiation to initiate polymerization of the curable monomer, leading to a robust image.

In specific embodiments, the curable paste ink compositions can be employed in apparatus for direct printing ink jet processes, wherein when droplets of the melted ink are ejected in an imagewise pattern onto a recording substrate and the recording substrate is a final recording substrate, for example, direct to paper applications, although the substrate is not limited to paper. The substrate may be any suitable material such as paper, boxboard, cardboard, fabric, a transparency, plastic, glass, wood etc., although the ink is most specifically used in forming images on paper.

Alternatively, the inks can be employed in indirect (offset) printing ink jet applications, wherein when droplets of the melted ink are ejected in an imagewise pattern onto a recording substrate, the recording substrate is an intermediate transfer member and the ink in the imagewise pattern is subsequently transferred from the intermediate transfer member to a final recording substrate.

The inks are suited for jetting onto an intermediate transfer substrate, e.g., an intermediate transfuse drum or belt. In a suitable design, the image may be applied by jetting appropriately colored inks during four to eighteen rotations (incremental movements) of the intermediate transfuse member with respect to the ink jetting head, i.e., there is a small translation of the printhead with respect to the substrate in between each rotation. This approach simplifies the printhead design, and the small movements ensure good droplet registration. Transfuse, i.e., a transfer and fusing or partial fusing step, is desirable in forming the image as transfuse enables a high quality image to be built up on a rapidly rotating transfer member. Transfuse typically involves jetting the ink from the ink jet head onto an intermediate member such as a belt or drum, i.e., the transfuse member. This procedure allows the image to be rapidly built onto the transfuse member for subsequent transfer and fusing to an image receiving substrate.

The intermediate transfer member may take any suitable form, although it is preferably a drum or belt. The member surface may be at room temperature, although in embodiments it is preferable to heat the member such that a surface temperature thereof is maintained within a narrow temperature range so as to control the viscosity characteristics of the inks over a wide range of environmental conditions. This temperature is preferably at or below the second temperature. In this way, the ink is maintained on the surface of the transfer member until transfer to the image receiving substrate.

Following jetting to the intermediate transfer member and optional intermediate partial curing thereon, the ink is thereafter transferred to an image receiving substrate. The substrate may be any suitable material such as paper, boxboard, cardboard, fabric, a transparency, plastic, glass, wood etc., although the ink is most specifically used in forming images on paper. Following transfer to the substrate, the image on the substrate is exposed to radiation having an appropriate wavelength, mainly the wavelength at which the ink initiator absorbs radiation, to initiate the curing reaction of the ink. The radiation exposure need not be long, and may be for, e.g., about 0.05 to about 10 seconds, more preferably from about 0.2 to about 5 seconds. These exposure times are more often expressed as substrate speeds of the ink passing under a UV lamp. For example, the microwave energized, doped mercury bulbs available from UV Fusion (Gaithersburg, Md.) are placed in an elliptical mirror assembly that is 10 cm wide; multiple units may be placed in series. Thus, a belt speed of 0.1 ms$^{-1}$ would require 1 second for a point of an image to pass under a single unit, while a belt speed 4.0 ms$^{-1}$ would require 0.2 s to pass under four bulb assemblies. The radiation to cure the polymerizable components of the ink is preferably provided by a variety of possible techniques, including but not limited to a xenon lamp, laser light, D or H bulb, light emitted diode, etc. The curing light may be filtered or focused, if desired or necessary. The curable components of the ink react to form a cured or crosslinked network of appropriate hardness. Specifically, the curing is substantially complete, i.e., at least 75% of the curable components are cured (polymerized and/or crosslinked), to allow the ink to be substantially hardened, and thereby to be much more scratch resistant, and also to adequately control the amount of showthrough on the substrate.

When an indirect printing process is used, the intermediate transfer member can be of any desired or suitable configuration, such as a drum or roller, a belt or web, a flat surface or platen, or the like preferably, in specific embodiments wherein the intermediate transfer member has good release properties. The intermediate transfer member can be heated by any desired or suitable method, such as by situating heaters in or near the intermediate transfer member, or the like. The intermediate transfer member may also be cooled by situating fans nearby or heat exchange with a cooled fluid. Optionally, a layer of a sacrificial liquid can be applied to the intermediate transfer member prior to ejecting the droplets of melted ink onto the intermediate transfer member, whereby the melted ink droplets are ejected onto the sacrificial liquid layer on the intermediate transfer member. Transfer from the intermediate transfer member to the final recording substrate can be by any desired or suitable method, such as by passing the final recording substrate through a nip formed by the intermediate transfer member and a back member, which can be of any desired or effective configuration, such as a drum or roller, a belt or web, a flat surface or platen, or the like.

The present disclosure is also directed to a printer containing the inks described herein. Specifically, the present disclosure relates to a printer cartridge containing the inks described herein, as well as to a printer containing the printer cartridge.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

Curable paste ink compositions were prepared by combining the components listed below in the amounts listed in Tables 1, 2, and 3 as follows. Ink components were added into a 350 milliliter amber glass bottle in proportion as provided in Tables 1, 2, and 3, in the following order: CD406®, SR368®, CD587®, Unilin 350® acrylate, Derivative A, Irgacure® 819, Irgacure® 379, and Irgacure® 907, followed by the liquid monomer(s) (SR335®, SR9003®, SR454®, SR399®), to obtain a total of 10 grams of ink. To this 10 gram mixture was added a stir bar and the mixtures were placed in a Variomag reaction block. The ink mixtures were heated and stirred at about 90° C. and 300 rpm (revolutions per minute) for at least 20 minutes or until the mixture appeared homogenous. The temperature was increased to 100° C. for about 5 minutes. The mixture was brought back down to 90° C. and left to stir for 90 minutes. A similar procedure can be used for larger amounts of inks.

CD406® is a difunctional cycloaliphatic acrylate monomer (cyclohexane dimethanol diacrylate, melting point about 78° C.), curable solid component, available from Sartomer Company, Inc.;

SR368® is a trifunctional monomer (tris (2-hydroxy ethyl) isocyanurate triacrylate, melting point about 50 to about 55° C.), curable solid component, available from Sartomer Company, Inc.;

CD587® is an behenyl acrylate monofunctional monomer (C18, C20, C22 mixture, melting point about 55° C.), curable solid component, Sartomer Company, Inc.;

SR335® is lauryl acrylate, a low volatility curable liquid monofunctional monomer with a long chain aliphatic hydrophobic backbone available from Sartomer Co. Inc., of the formula

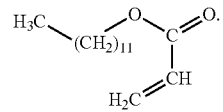

SR9003® is propoxylated neopentyl glycol diacrylate, a liquid curable difunctional monomer available from Sartomer Co. Inc., of the formula

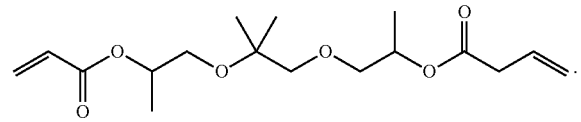 [SMILES: C=CCC(=O)OC(C)COCC(C)(C)OCC(C)OC(=O)C=C]

SR454® is 3 mole ethoxylated trimethylolpropane triacrylate, a liquid curable trifunctional monomer available from Sartomer Co. Inc., of the formula

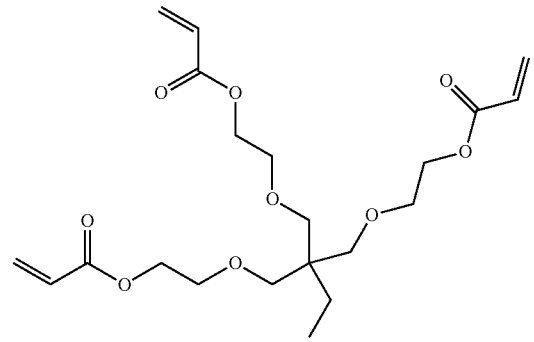

SR399® is dipentaerythritol pentaacrylate, a liquid curable pentafunctional monomer available from Sartomer Co. Inc., of the formula

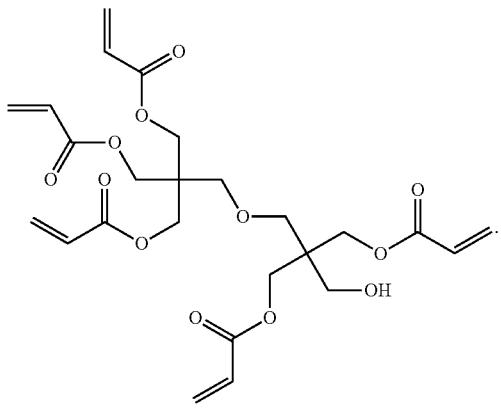 [SMILES: C=CC(=O)OCC(CO)(COCC(COC(=O)C=C)(COC(=O)C=C)COC(=O)C=C)COC(=O)C=C]

Unilin® 350 acrylate is a curable monofunctional acrylate wax available from Baker Petrolite, (C22, C23, C24 mixture, melting point about 78 to about 83 C). Unilin® 350 can be used as received or synthesized as described in U.S. Pat. No. 7,559,639, which is hereby incorporated by reference herein in its entirety;

Derivative A is an ethoxylated octylphenol derivative described hereinabove and prepared as follows. To a 250 milliliter flask equipped with a stir magnet was charged a premelted mixture of 70 grams of IGEPAL® CA210, (MW=261) an ethoxylated octylphenol formerly manufactured by Rhone-Poulenc Co. and currently manufactured by Rhodia, and 80 grams of Unilin® 425 (OH #95.3, MW=589), a fully saturated, long chain, linear primary alcohol available from Baker Hughes. The flask was placed in a 140° C. oil bath with thermometer, and heated and stirred. After about 5 minutes, 30 grams of IPDI (MW=222) of the formula

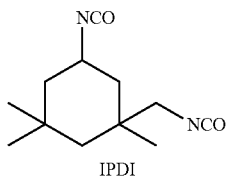

was added, followed by three drops of Fascat® 4202 dibutyltin dilaurate catalyst, of the formula $Bu_2Sn(OOC_{12}H_{23})_2$, available from Arkema Inc. An exotherm was observed. After about 1.5 hours, an IR spectrum was obtained on the reaction product and no isocyanate peak (about 2230 cm$^{-1}$) was observed. The contents were poured into aluminum tins and allowed to cool and solidify.

Amide Gellant as described in U.S. Patent Publication 2010/0242790A1, which is hereby incorporated by reference herein in its entirety, was prepared as follows.

Organoamide synthesis. An organoamide was prepared according to the following reaction scheme.

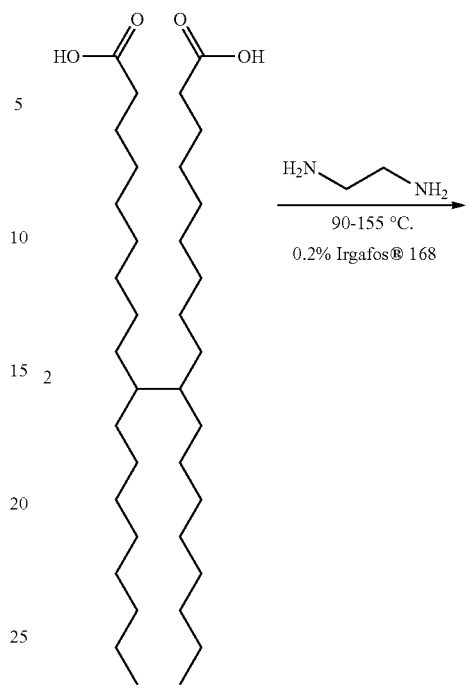

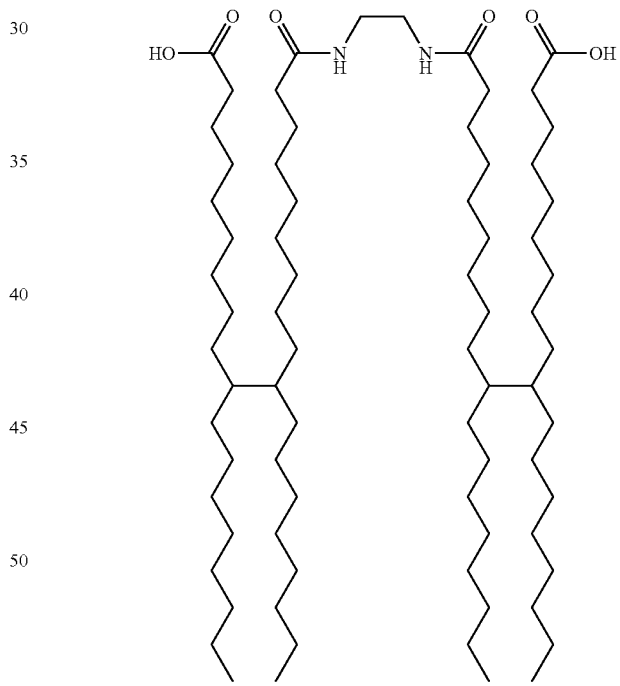

To a 2 liter kettle equipped with a 4-bladed PTFE (polytetrafluoroethylene) impeller, dropping funnel, Dean-Stark trap, reflux condenser, and thermocouple proved was added 1,035.33 grams (1790 millimoles) of Pripol® 1009 dimer diacid (Uniqema, New Castle, Del.) of the formula $C_{36}H_{70}O_4$ as shown above. [The acid number was 194 milligrams KOH/g, calculated molecular weight (MW) is 1000/[0.5[(acid#/MW KOH)]=578.03, or 98% active.] Next, 2.07 grams of Irgafos® 168 (0.2 weight %) trisarylphosphite processing stabilizer (Ciba®) was added with mixing, and the kettle was purged with Argon. The kettle was heated to 90° C. 60.4 milliliters (895 millimoles) of ethylenediamine was added to the dropping funnel, and slowly added to the Pripol® 1009 dimer diacid dropwise over a period of 30 minutes. The kettle was heated to 150° C. and wrapped with cotton wool and foil to maintain temperature. Water began to collect in the trap (15 milliliters) and vapor was seen emanating from the condenser top. After 2 hours at 150° C., the heat was turned off, and the molten organoamide was poured into aluminum pie plates to cool and harden. 1,043.6 grams of organoamide was isolated.

Gellant synthesis. An amide gellant was prepared according to the following reaction scheme.

grams (808 millimoles) of SR495B® (caprolactone acrylate, Sartomer), 181 grams (808 millimoles) of Irgacure® 2959 (4-(2-hydroxyethoxy)phenyl-(2-hydroxy-2-propyl)ketone photoinitiator, Ciba Specialty Chemicals), were added with mixing at room temperature. After 18 hours, DCHU (dicyclohexylurea) byproduct was filtered off and the dichloromethane solvent was removed by rotary evaporation. The product was transferred to a large foil pan and dried in a vacuum oven for 3 hours at 50° C. Acid #: 0.65. Amine #: 3.87. The product was vacuum dried for an additional 8 hours

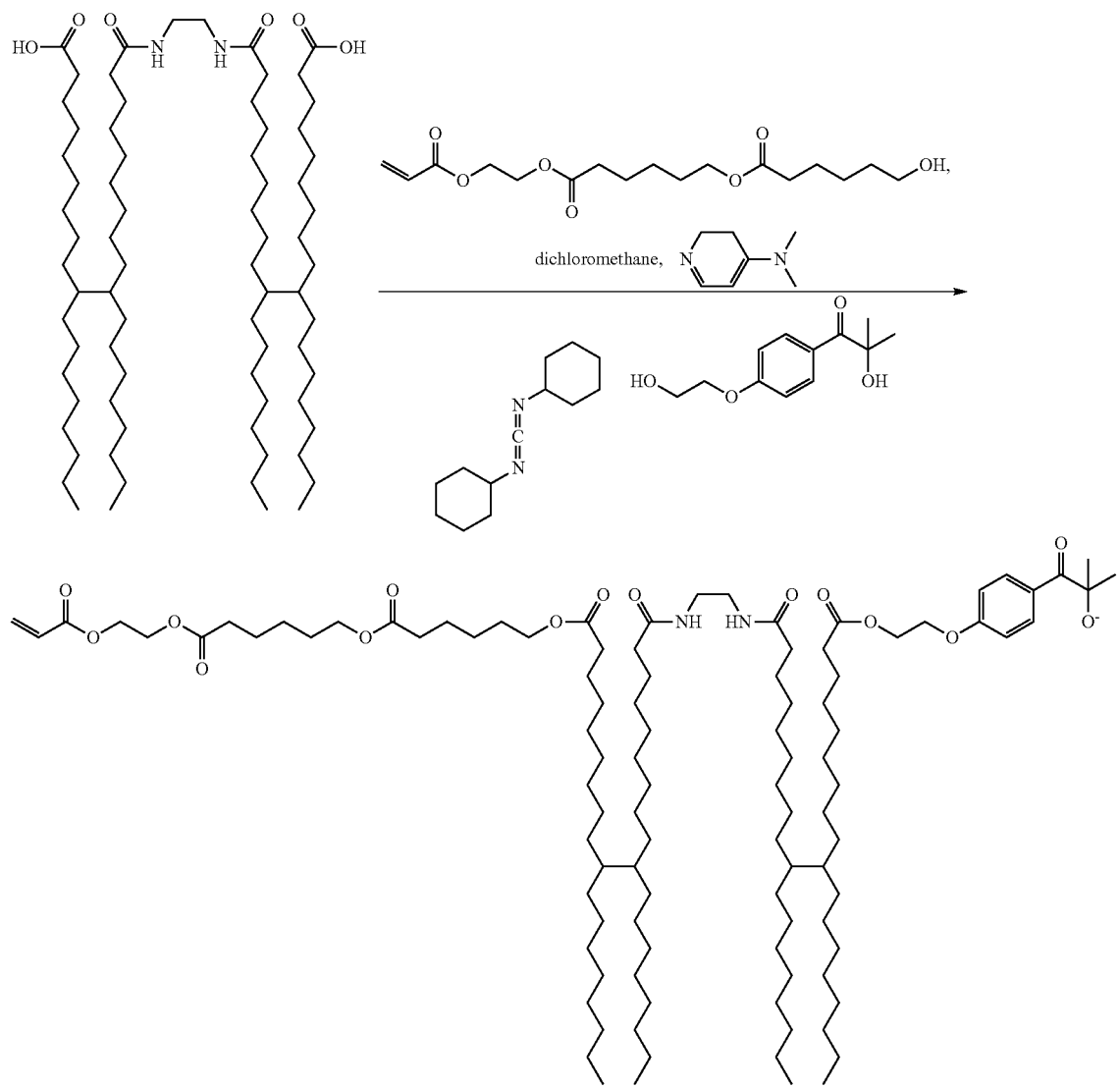

To a 20 liter reaction flask equipped with an overhead stirrer (metal spiral mixer) was added 936 grams (808 millimoles) of the above described organoamide, the transfer aided by the use of a hot air gun to melt the material into a flowable state. Next, 15 liters of dichloromethane was added, and the mixture was allowed to soak overnight with mixing to complete the dissolution of the organoamide starting material. Next, 400 grams (1,940 millimoles) of dicyclohexylcarbodiimide (DCC, coupling agent), 14.81 grams (121 millimoles) of 4-dimethylaminopyridine (DMAP, catalyst), 278 at 50° C. % solids analysis (30 minutes at 80° C.) shows 2 weight % dichloromethane present. 1,438.3 grams of amide gellant were isolated.

Irgacure® 819 is a bis acyl phosphine photoinitiator comprising bis(2,4,6-trimethyl benzoyl)-phenylphosphineoxide, melting point 127 to 133° C., available from Ciba Specialty Chemicals.

Irgacure® 184 is an α-hydroxy ketone photoinitiator comprising 1-hydroxy-cyclohexyl-phenyl-ketone, melting point 45 to 49° C., available from Ciba Specialty Chemicals.

Irgacure® 907 is an α-amino-ketone photoinitiator comprising 2-methyl-1[4-(methylthio)phenyl]-2-morpholino-propan-1-one, melting point 70 to 75° C., available from Ciba Specialty Chemicals.

TABLE 1

Examples 1-11 (Units in grams)

| Example Number | CD406® | SR368® | CD587® | SR335® | SR9003® | SR454® | SR399® |
|---|---|---|---|---|---|---|---|
| 1 | 2.527 | 0.196 | 1.539 | 0.675 | 0.000 | 0.000 | 0.675 |
| 2 | 2.450 | 0.191 | 1.493 | 0.000 | 0.675 | 0.675 | 0.000 |
| 3 | 2.659 | 0.207 | 1.620 | 0.000 | 0.000 | 0.000 | 0.675 |
| 4 | 2.527 | 0.196 | 1.539 | 0.675 | 0.000 | 0.675 | 0.000 |
| 5 | 2.450 | 0.191 | 1.493 | 0.675 | 0.000 | 0.675 | 0.000 |
| 6 | 2.736 | 0.213 | 1.667 | 0.000 | 0.000 | 0.675 | 0.000 |
| 7 | 2.527 | 0.196 | 1.539 | 0.675 | 0.675 | 0.000 | 0.000 |
| 8 | 2.527 | 0.196 | 1.539 | 0.000 | 0.675 | 0.675 | 0.000 |
| 9 | 2.736 | 0.213 | 1.667 | 0.000 | 0.000 | 0.000 | 0.675 |
| 10 | 2.659 | 0.207 | 1.620 | 0.675 | 0.000 | 0.000 | 0.000 |
| 11 | 2.945 | 0.229 | 1.794 | 0.000 | 0.000 | 0.000 | 0.000 |

| Example Number | Unilin® 350 Acrylate | Derivative A | Amide Gellant | Irgacure® 819 | Irgacure® 184 | Irgacure® 1907 |
|---|---|---|---|---|---|---|
| 1 | 0.729 | 2.478 | 0.686 | 0.160 | 0.231 | 0.103 |
| 2 | 0.707 | 2.403 | 0.666 | 0.240 | 0.347 | 0.155 |
| 3 | 0.768 | 2.608 | 0.722 | 0.240 | 0.347 | 0.155 |
| 4 | 0.729 | 2.478 | 0.686 | 0.160 | 0.231 | 0.103 |
| 5 | 0.707 | 2.403 | 0.666 | 0.240 | 0.347 | 0.155 |
| 6 | 0.790 | 2.683 | 0.743 | 0.160 | 0.231 | 0.103 |
| 7 | 0.729 | 2.478 | 0.686 | 0.160 | 0.231 | 0.103 |
| 8 | 0.729 | 2.478 | 0.686 | 0.160 | 0.231 | 0.103 |
| 9 | 0.790 | 2.683 | 0.743 | 0.160 | 0.231 | 0.103 |
| 10 | 0.768 | 2.608 | 0.722 | 0.240 | 0.347 | 0.155 |
| 11 | 0.850 | 2.888 | 0.800 | 0.160 | 0.231 | 0.103 |

TABLE 2

Examples 12-23 (Units in grams)

| Example Number | CD406® | SR368® | CD587® | SR335® | SR9003® | SR454® | SR399® |
|---|---|---|---|---|---|---|---|
| 12 | 2.736 | 0.213 | 1.667 | 0.675 | 0.000 | 0.000 | 0.000 |
| 13 | 2.450 | 0.191 | 1.493 | 0.675 | 0.675 | 0.000 | 0.000 |
| 14 | 2.450 | 0.191 | 1.493 | 0.000 | 0.000 | 0.675 | 0.675 |
| 15 | 2.450 | 0.191 | 1.493 | 0.000 | 0.675 | 0.675 | 0.000 |
| 16 | 2.736 | 0.213 | 1.667 | 0.000 | 0.675 | 0.000 | 0.000 |
| 17 | 2.603 | 0.202 | 1.586 | 0.246 | 0.246 | 0.246 | 0.246 |
| 18 | 2.659 | 0.207 | 1.620 | 0.000 | 0.675 | 0.000 | 0.000 |
| 19 | 2.527 | 0.196 | 1.539 | 0.000 | 0.000 | 0.675 | 0.675 |
| 20 | 2.659 | 0.207 | 1.620 | 0.000 | 0.000 | 0.675 | 0.000 |
| 21 | 2.659 | 0.207 | 1.620 | 0.000 | 0.000 | 0.675 | 0.000 |
| 22 | 2.527 | 0.196 | 1.539 | 0.000 | 0.675 | 0.000 | 0.675 |
| 23 | 2.868 | 0.223 | 1.747 | 0.000 | 0.000 | 0.000 | 0.000 |

| Example Number | Unilin® 350 Acrylate | Derivative A | Amide Gellant | Irgacure® 819 | Irgacure® 184 | Irgacure® 1907 |
|---|---|---|---|---|---|---|
| 12 | 0.790 | 2.683 | 0.743 | 0.160 | 0.231 | 0.103 |
| 13 | 0.707 | 2.403 | 0.666 | 0.240 | 0.347 | 0.155 |
| 14 | 0.707 | 2.403 | 0.666 | 0.240 | 0.347 | 0.155 |
| 15 | 0.707 | 2.403 | 0.666 | 0.240 | 0.347 | 0.155 |
| 16 | 0.790 | 2.683 | 0.743 | 0.160 | 0.231 | 0.103 |
| 17 | 0.751 | 2.553 | 0.707 | 0.199 | 0.288 | 0.128 |
| 18 | 0.768 | 2.608 | 0.722 | 0.240 | 0.347 | 0.155 |
| 19 | 0.729 | 2.478 | 0.686 | 0.160 | 0.231 | 0.103 |
| 20 | 0.768 | 2.608 | 0.722 | 0.240 | 0.347 | 0.155 |
| 21 | 0.768 | 2.608 | 0.722 | 0.240 | 0.347 | 0.155 |
| 22 | 0.729 | 2.478 | 0.686 | 0.160 | 0.231 | 0.103 |
| 23 | 0.828 | 2.813 | 0.779 | 0.240 | 0.347 | 0.155 |

TABLE 3

Examples 24-32 (Units in grams)

| Example Number | CD406 ® | SR368 ® | CD587 ® | SR335 ® | SR9003 ® | SR454 ® | SR399 ® |
|---|---|---|---|---|---|---|---|
| 24 | 2.527 | 0.196 | 1.539 | 0.000 | 0.675 | 0.000 | 0.675 |
| 25 | 2.450 | 0.191 | 1.493 | 0.000 | 0.970 | 0.000 | 0.627 |
| 26 | 2.527 | 9.196 | 1.539 | 0.000 | 0.000 | 0.675 | 0.675 |
| 27 | 2.450 | 0.191 | 1.493 | 0.000 | 1.597 | 0.000 | 0.000 |
| 28 | 2.450 | 0.191 | 1.493 | 0.000 | 0.000 | 1.597 | 0.000 |
| 29 | 2.527 | 0.196 | 1.539 | 0.000 | 0.675 | 0.507 | 0.167 |
| 30 | 2.527 | 0.196 | 1.539 | 0.000 | 0.675 | 0.353 | 0.322 |
| 31 | 2.527 | 0.196 | 1.539 | 0.000 | 0.675 | 0.675 | 0.000 |
| 32 | 2.450 | 0.191 | 1.493 | 0.000 | 0.675 | 0.251 | 0.675 |

| Example Number | Unilin ® 350 Acrylate | Derivative A | Amide Gellant | Irgacure ® 819 | Irgacure ® 184 | Irgacure ® 1907 |
|---|---|---|---|---|---|---|
| 24 | 0.729 | 2.478 | 0.686 | 0.160 | 0.231 | 0.103 |
| 25 | 0.707 | 2.403 | 0.666 | 0.160 | 0.231 | 0.103 |
| 26 | 0.729 | 2.478 | 0.686 | 0.160 | 0.231 | 0.103 |
| 27 | 0.707 | 2.403 | 0.666 | 0.160 | 0.231 | 0.103 |
| 28 | 0.707 | 2.403 | 0.666 | 0.160 | 0.231 | 0.103 |
| 29 | 0.729 | 2.478 | 0.686 | 0.160 | 0.231 | 0.103 |
| 30 | 0.729 | 2.478 | 0.686 | 0.160 | 0.231 | 0.103 |
| 31 | 0.729 | 2.478 | 0.686 | 0.160 | 0.231 | 0.103 |
| 32 | 0.707 | 2.403 | 0.666 | 0.160 | 0.231 | 0.103 |

Example 33

A solid magenta pigment concentrate was prepared by first adding 123.4 grams of CD406® to a solution of EFKA® 4340 (acrylic block copolymer dispersing agent in methoxypropanol, 92.3 grams at about 56% solids content, BASF), to provide a Mixture A. Mixture A was heated and rotary evaporated to remove methoxypropanol to provide a Mixture B of EFKA® 4340 in CD406® (178.9 grams, 31% EFKA® 4340). Mixture B was then used to prepared a magenta concentrate by combining 178.9 grams of Mixture B, 158 grams of CD406®, and 86.5 grams of Microlith® Magenta JET 2B (BASF), and homogenizing with a Polytron® at a temperature of 90° C. for 15 minutes at 10,000 rpm to provide a magenta pigment concentrate comprising 21% magenta pigment, 66.4% CD406®, and 12.6% dispersant.

Examples 34-66

0.2 gram (about 2 weight %) of the solid magenta pigment concentrate of Example 33 is added to 10 grams of each of the ink composition of Examples 1-32 to provide pigmented magenta curable paste ink Examples 34-66.

Pre- and post-cure hardness measurements for Examples 1-32 were obtained using a PTC® Durometer. In comparison to the present examples, the hardness of a commercial sample of a conventional solid ink sold for use in the Xerox Phaser® series of printers is 67.

As shown in Table 4, the pre-cure or initial hardness, curing rate (initial slope), hardness after cure (final hardness), for Examples 1-32 ranged from about 0.1 to about 24.76 for pre-cured hardness, from about 72.24 to about 84.26 for post-cured hardness, and from about 162.77 to about 356.05 for initial slope (rate of cure).

TABLE 4

| Pre-cured hardness, post-cured hardness, and initial slope ranges Examples 1-32 | |
|---|---|
| Responses for Examples 1-32 | Range |
| Pre-Cured Hardness | 0.1-24.76 |
| Post-Cured Hardness | 72.24-84.26 |
| Initial Slope (rate of cure in feet/second) | 162.77-356.05 |

The hardness and curing rate data were obtained from hardness versus exposure time (second/foot (s/ft)) plots using the following expressions:

$$y = m_1 + m_2 \cdot (1 \exp(-m_3 \cdot x));$$

$$\text{initial hardness (pre-cured hardness)} = m_1;$$

$$\text{initial slope (curing rate)} = m_2 \cdot m_3;$$

$$\text{final hardness (post-cured hardness)} = m_1 + m_2$$

The cure rate was obtained by measuring the variation of hardness versus ultraviolet light exposure. A 600W Fusion UV Systems, Inc., Lighthammer® equipped with a D-bulb was used to irradiate the ink compositions of Examples 1-32 and hardness was measured after specific exposure times. The hardness versus cure speed (s/ft) plot was used to obtain the initial curing rate for the ink vehicle.

FIG. 1 illustrates the hardness (y-axis) versus exposure time (x-axis) for Examples 3, 13, and 14. The inks herein enable low energy ink spreading prior to curing. The inks herein provide a significant reduction in energy required for spreading the ink during the transfuse process. This is associated with the fact that the pre-cured hardness is very low compared to the ink of the prior art while at the same time achieving high post-cured hardness. In embodiments, the inks herein can be spread less energy than required from conventional phase change inks. As described above, in embodiments, the radiation curable solid ink composition herein forms a semi-solid state deformable with a minimum stress that is a minimum of 2 psi less than the stress needed for deformation at room temperature at an intermediate temperature between a jetting temperature and a substrate temperature and wherein the radiation curable paste ink compositions remains in a liquid or semi-solid state for a period of time prior to solidification on the substrate. In embodiments, at room temperature, the paste is deformable with a minimum stress of 50 pounds per square inch (psi), or a minimum of 35 psi, or in a specific embodiment a minimum stress of 10 psi. Further, inks herein show a latitude of hardness versus exposure time which enables pinning (partial cure of the ink) UV exposure to control properties of the inks before final cure, which can be used as a method to control spreading and final gloss of the image. Deformation stress increases over initial stress.

The model ink and pigmented inks of the present disclosure meet viscosity requirements for jettability in a Xerox® Phaser® printer. In embodiments, the model ink and pigmented inks of the present disclosure meet viscosity requirements for jettability in a Xerox® Phaser® printer having a printhead frequency of 36 Khz, at a jetting temperature of 95° C., at a print speed of 355×464 dots per inch.

Curable solid and paste inks of the present disclosure retain the advantages of handling and safety associated with solid phase change inks and of the curable solid inks proposed earlier. The curable and solid paste inks herein further provide additional breakthrough performance with respect to robustness, initial rate of curing, minimum shrinkage, higher hardness after curing than conventional solid inks, as well as lower energy requirements for spreading the ink, making them "greener" compared to previous curable solid inks. Further, the addition of a gelling agent along with liquid monomers selected herein controls spreading prior to final curing while providing materials that are easily spread before the curing step.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. A radiation curable paste ink composition comprising:
   at least one curable wax that is curable by free radical polymerization;
   at least one curable liquid component that is a liquid at a temperature of from about 20 to about 25° C., present in an amount of less than about 20 percent by weight based upon the total weight of the curable paste ink composition;
   wherein the at least one liquid component is a compound of the formula

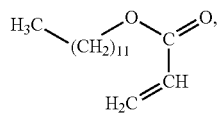

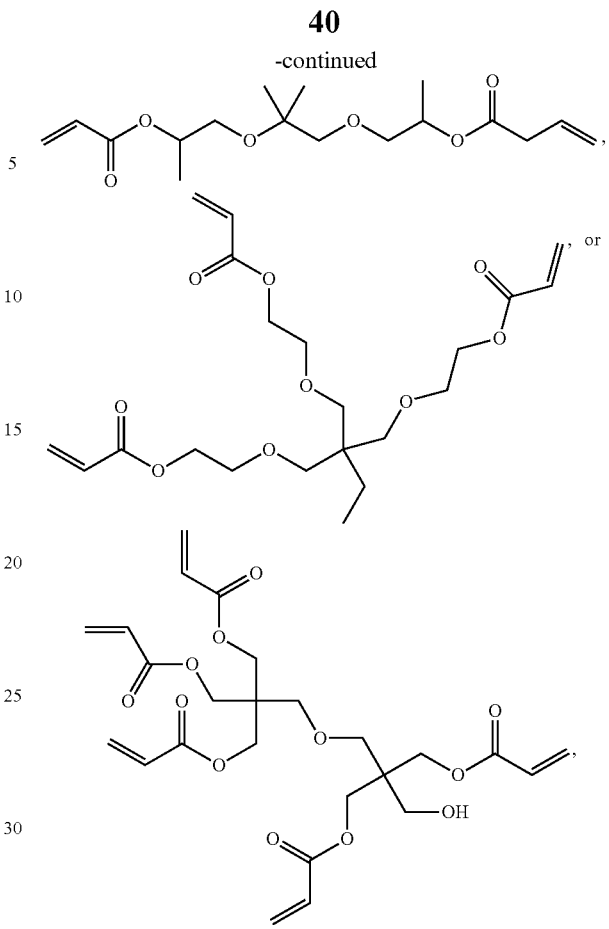

and mixtures and combinations thereof;
   optionally, a non-curable wax;
   at least one free-radical photoinitiator or photoinitiating moiety;
   at least one curable gellant; and
   optionally, a colorant;
   wherein the components form a curable ink composition that is a paste at a first temperature, wherein the first temperature is from about 20 to about 25° C.; and
   wherein the components form a liquid composition at a second temperature, wherein the second temperature is greater than about 40° C.

2. The radiation curable paste ink composition of claim 1, wherein the at least one curable wax contains an acrylate, methacrylate, alkene, vinyl, or allylic ether functional group.

3. The radiation curable paste ink composition of claim 1, wherein the at least one liquid component is selected from the group consisting of a monofunctional monomer, a difunctional monomer, a trifunctional monomer, a pentafunctional monomer, and combinations thereof.

4. The radiation curable paste ink composition of claim 1, wherein the at least one liquid component comprises a monomer having at least three functional groups.

5. The radiation curable paste ink composition of claim 1, wherein the at least one liquid component comprises a combination of difunctional monomer and pentafunctional monomer present in a 1:1 to 1.5:1 ratio of difunctional monomer to pentafunctional monomer, and wherein the total combined amount of difunctional monomer and pentafunctional monomer is from about 13.5 to about 16% by weight based upon the total weight of the curable paste ink composition; or wherein the at least one liquid component comprises a combination of trifunctional monomer and pentafunctional monomer present in a 1:1 to 1.5:1 ratio of trifunctional monomer to pentafunctional monomer, and wherein the total combined amount of trifunctional and pentafunctional monomer is from about 13.5 to 16% by weight based upon the total weight of the curable paste ink composition.

6. The radiation curable paste ink composition of claim 1, wherein the at least one liquid component comprises a 1:1 ratio of pentafunctional monomer and difunctional monomer wherein the combined total amount of pentafunctional and difunctional monomer is from about 13.5 to about 16 percent by weight based on the total weight of the curable paste ink composition; or
wherein the at least one liquid component comprises a combination of trifunctional monomer and pentafunctional monomer present in a 1:1 ratio of trifunctional monomer to pentafunctional monomer, and wherein the total combined amount of trifunctional monomer and pentafunctional monomer is about 13.5% by weight based upon the total weight of the curable paste ink compositions.

7. The radiation curable paste ink composition of claim 1, wherein the at least one liquid component is present in an amount of less than about 16 percent by weight based upon the total weight of the curable paste ink composition.

8. The radiation curable paste ink composition of claim 1, wherein the at least one liquid component is present in an amount of from about 13.5 to about 16 percent by weight based upon the total weight of the curable paste ink composition.

9. The radiation curable paste ink composition of claim 1, wherein the non-curable wax is an ester wax.

10. The radiation curable paste ink composition of claim 1, wherein the non-curable wax is an ethoxylated octylphenol derivative selected from the group consisting of

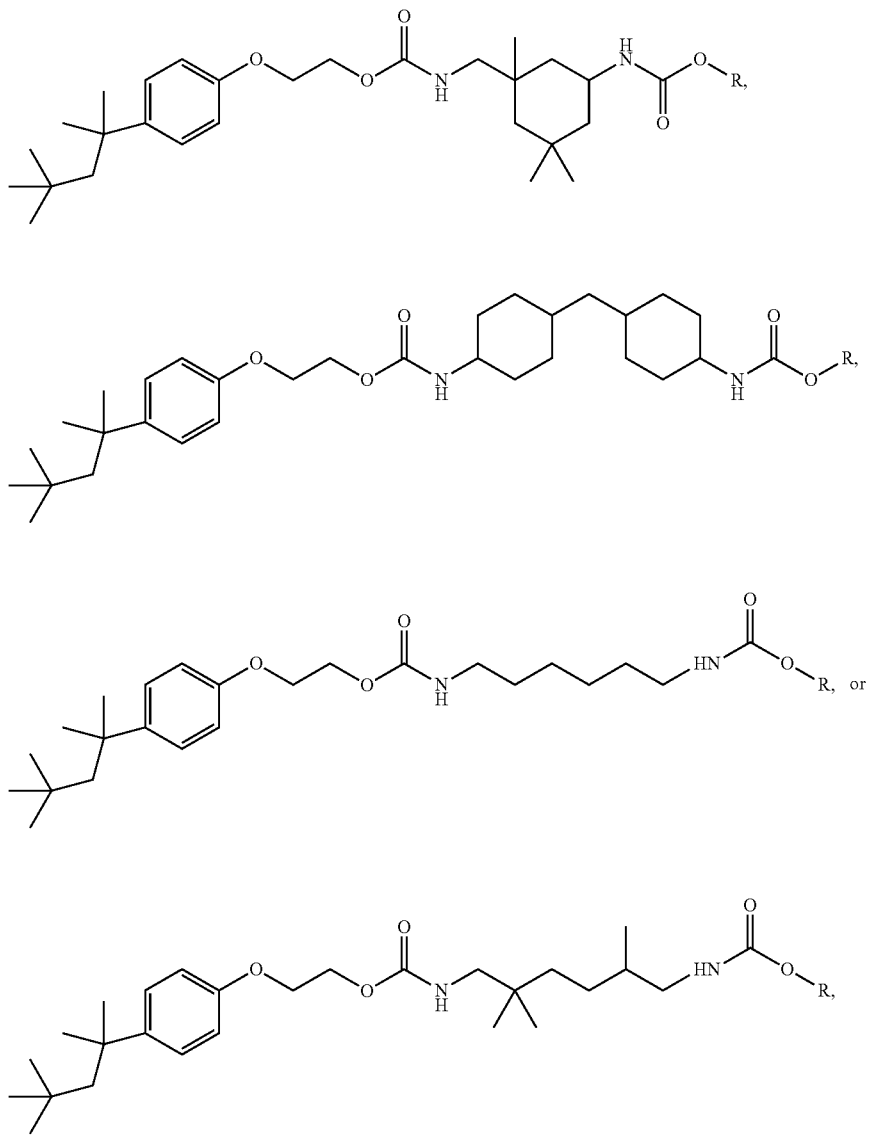

and mixtures and combinations thereof.

11. The radiation curable solid ink composition of claim 1, wherein the photoinitiator is an ultraviolet radiation activated photoinitiator.

12. The radiation curable paste ink composition of claim 1, wherein the curable paste ink composition has an initial rate of curing of greater than about 350 feet/second.

13. The radiation curable paste ink composition of claim 1, wherein at room temperature the curable paste ink composition is deformable with a minimum stress of 50 pounds per square inch.

14. The radiation curable paste ink composition of claim 1, wherein curable paste ink composition forms a semi-solid state that is deformable with a stress that is a minimum of 2 pounds per square inch less than the stress needed for deformation at room temperature at an intermediate temperature, wherein the intermediate temperature is a temperature that is between a jetting temperature and a substrate temperature.

15. The radiation curable paste ink composition of claim 1, the curable paste ink composition has a hardness after curing of about 70 to about 95.

16. The radiation curable paste ink composition of claim 1, wherein the composition has a pre-cure hardness in the range of about 0.1 to about 25 at room temperature.

17. A process comprising:
(1) incorporating into an ink jet printing apparatus a curable paste ink composition comprising at least one curable wax that is curable by free radical polymerization; at least one curable liquid component that is a liquid at a temperature of from about 20 to about 25 ° C., present in an amount of less than about 20 percent by weight based upon the total weight of the curable paste ink composition; wherein the at least one liquid component is a compound of the formula

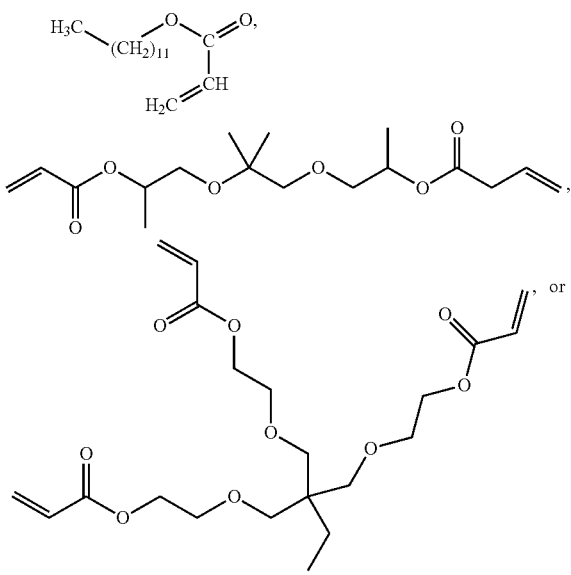

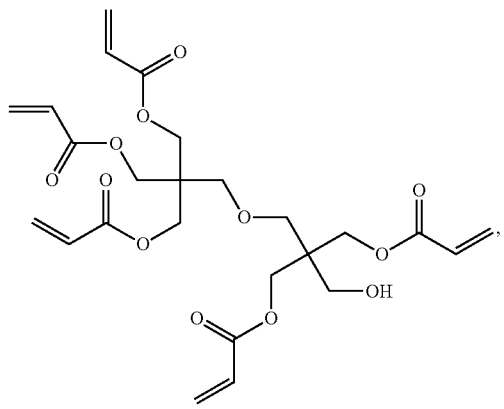

And mixtures and combinations thereof; optionally, a non-curable wax; at least one free-radical photoinitiator or photoinitiating moiety; at least one curable gellant; and optionally, a colorant; wherein the components form a curable ink composition that is a paste at a first temperature, wherein the first temperature is from about 20 to about 25 ° C.; and wherein the components form a liquid composition at a second temperature, wherein the second temperature is greater than about 40° C.;

(2) melting the ink;
(3) causing droplets of the melted ink to be ejected in an imagewise pattern onto an image receiving substrate, wherein the image receiving substrate is an intermediate transfer member or a final image receiving substrate;
(4) optionally transferring the ink image from the intermediate transfer member to the final image receiving substrate; and
(5) exposing the imagewise pattern on the final recording substrate to ultraviolet radiation.

18. The process of claim 17, wherein the at least one liquid component comprises a combination of difunctional monomer and pentafunctional monomer present in a 1:1 to 1.5:1 ratio of difunctional monomer to pentafunctional monomer, and wherein the total combined amount of difunctional monomer and pentafunctional monomer is from about 13.5 to about 16% by weight based upon the total weight of the curable paste ink composition; or
wherein the at least one liquid component comprises a combination of trifunctional monomer and pentafunctional monomer present in a 1:1 to 1.5:1 ratio of trifunctional monomer to pentafunctional monomer, and wherein the total combined amount of trifunctional and pentafunctional monomer is from about 13.5 to 16% by weight based upon the total weight of the curable paste ink composition.

19. The process of claim 17,
wherein the non-curable wax is an ethoxylated octylphenol derivative selected from the group consisting of

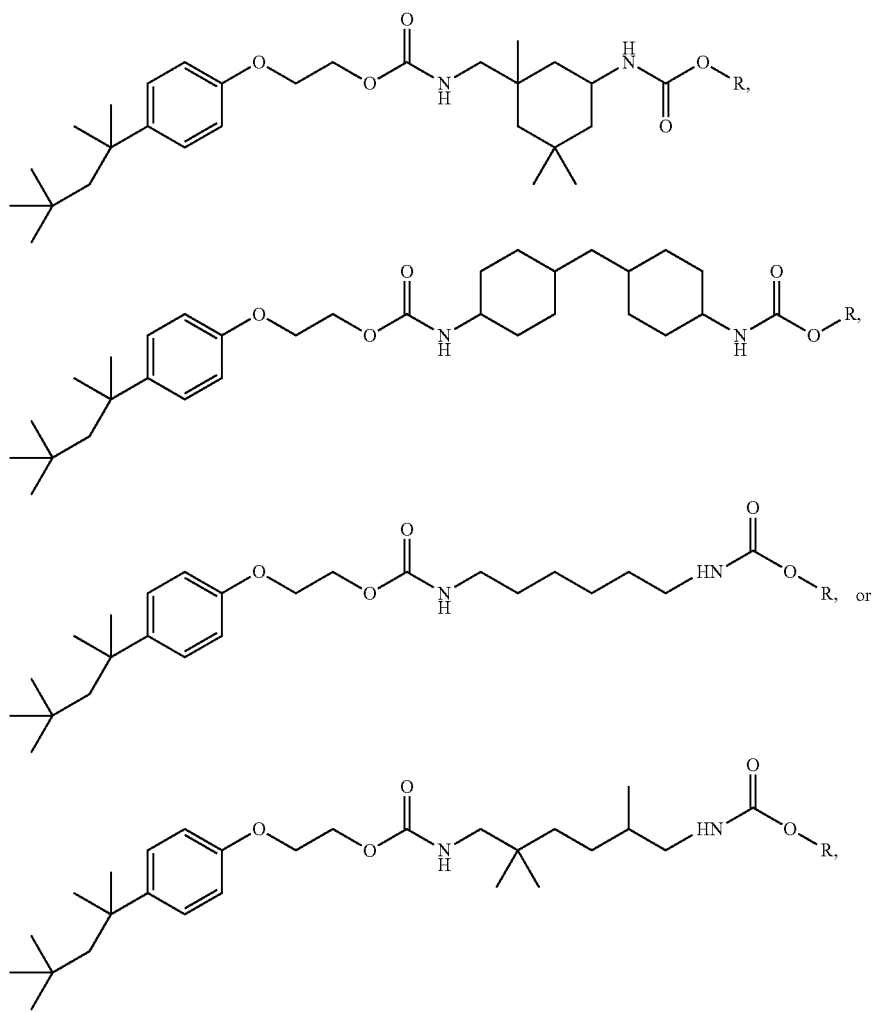
and mixtures and combinations thereof.
* * * * *